(12) United States Patent
Zhang et al.

(10) Patent No.: US 11,997,107 B2
(45) Date of Patent: May 28, 2024

(54) DECENTRALIZED TECHNIQUES FOR VERIFICATION OF DATA IN TRANSPORT LAYER SECURITY AND OTHER CONTEXTS

(71) Applicant: Cornell University, Ithaca, NY (US)

(72) Inventors: Fan Zhang, New York, NY (US); Sai Krishna Deepak Maram, New York, NY (US); Harjasleen Malvai, Ithaca, NY (US); Steven Goldfeder, Spring Valley, NY (US); Ari Juels, New York, NY (US)

(73) Assignee: Cornell University, Ithaca, NY (US)

( * ) Notice: Subject to any disclaimer, the term of this patent is extended or adjusted under 35 U.S.C. 154(b) by 171 days.

(21) Appl. No.: 17/636,402

(22) PCT Filed: Aug. 28, 2020

(86) PCT No.: PCT/US2020/048344
§ 371 (c)(1),
(2) Date: Feb. 18, 2022

(87) PCT Pub. No.: WO2021/041771
PCT Pub. Date: Mar. 4, 2021

(65) Prior Publication Data
US 2022/0377084 A1 Nov. 24, 2022

Related U.S. Application Data

(60) Provisional application No. 62/894,052, filed on Aug. 30, 2019.

(51) Int. Cl.
*H04L 9/40* (2022.01)
(52) U.S. Cl.
CPC .................................. *H04L 63/126* (2013.01)

(58) Field of Classification Search
CPC ..... H04L 9/0816; H04L 9/0841; H04L 9/085; H04L 63/0281; H04L 63/123; H04L 63/126; H04L 2209/46; H04L 2209/76
See application file for complete search history.

(56) References Cited

U.S. PATENT DOCUMENTS

| 7,197,639 | B1 | 3/2007 | Juels et al. |
| 7,962,413 | B2 | 6/2011 | Lisanke et al. |

(Continued)

FOREIGN PATENT DOCUMENTS

| EP | 20857172.9 | 8/2023 |
| WO | 1998025375 A1 | 6/1998 |

OTHER PUBLICATIONS

J. Zhang et al., "Learning-Based Anomaly Detection in BGP Updates," Proceedings of the 2005 ACM SIGCOMM Workshop on Mining Network, Aug. 2005, 2 pages.

(Continued)

*Primary Examiner* — Eric W Shepperd
(74) *Attorney, Agent, or Firm* — Ryan, Mason & Lewis, LLP

(57) ABSTRACT

A verifier device in one embodiment is configured to communicate over one or more networks with a client device and a server device. The verifier device participates in a three-party handshake protocol with the client device and the server device in which the verifier device and the client device obtain respective shares of a session key of a secure session with the server device. The verifier device receives from the client device a commitment relating to the secure session with the server device, and responsive to receipt of the commitment, releases to the client device additional information relating to the secure session that was not previously accessible to the client device. The verifier device verifies correctness of at least one characterization of data obtained by the client device from the server device as part (Continued)

of the secure session, based at least in part on the commitment and the additional information.

25 Claims, 10 Drawing Sheets

(56) References Cited

U.S. PATENT DOCUMENTS

| | | | |
|---|---|---|---|
| 8,457,317 B2* | 6/2013 | Shaw | G06F 21/6218 |
| | | | 713/168 |
| 8,504,822 B2 | 8/2013 | Wang et al. | |
| 9,584,517 B1 | 2/2017 | Roth et al. | |
| 10,567,434 B1* | 2/2020 | Sharifi Mehr | H04L 63/0428 |
| 11,270,403 B2* | 3/2022 | Soundararajan | H04L 9/0643 |
| 2002/0010798 A1 | 1/2002 | Ben-Shaul et al. | |
| 2007/0033642 A1* | 2/2007 | Ganesan | H04L 63/1441 |
| | | | 726/10 |
| 2012/0272058 A1* | 10/2012 | Wang | H04L 63/0464 |
| | | | 713/156 |
| 2015/0188700 A1* | 7/2015 | Ben Saied | H04L 9/0838 |
| | | | 380/44 |
| 2015/0288667 A1* | 10/2015 | Alder | H04L 63/061 |
| | | | 713/171 |
| 2015/0347768 A1 | 12/2015 | Martin et al. | |
| 2017/0331791 A1 | 11/2017 | Wardell et al. | |
| 2017/0346851 A1 | 11/2017 | Drake | |
| 2017/0352027 A1 | 12/2017 | Zhang et al. | |
| 2018/0062854 A1* | 3/2018 | Kancharla | H04L 63/101 |
| 2019/0364045 A1* | 11/2019 | Armknecht | H04L 63/123 |
| 2020/0007327 A1* | 1/2020 | Garg | H04L 63/0428 |
| 2021/0320973 A1* | 10/2021 | Basu | G06Q 20/06 |
| 2021/0351918 A1* | 11/2021 | Kenyan | H04L 63/06 |

OTHER PUBLICATIONS

Y. Lindell et al., "Secure Multiparty Computation for Privacy Preserving Data Mining," Journal of Privacy and Confidentiality, May 6, 2008, 39 pages.
D. Maram et al., "CanDID: Can-Do Decentralized Identity with Legacy Compatibility, Sybil-Resistance, and Accountability," 2021 IEEE Symposium on Security and Privacy, May 25, 2021, 21 pages.
S. Matetic et al., "DelegaTEE: Brokered Delegation Using Trusted Execution Environments," USENIX Security Symposium, Aug. 15-17, 2018, 20 pages.
K. Miyazaki et al., "Digitally Signed Document Sanitizing Scheme with Disclosure Condition Control," IEICE Transactions on Fundamentals of Electronics, Communications and Computer Science, Jan. 2005, 8 pages.
M. Myers et al., "X.509 Internet Public Key Infrastructure Online Certificate Status Protocol-OCSP," Internet Engineering Task Force, Jun. 2013, 82 pages.
F. Zhang et al., "Town Crier: An Authenticated Data Feed for Smart Contracts," The 23rd ACM Conference on Computer and Communications Security, Oct. 24-28, 2016, pp. 270-282.
O. Goldreich, "Foundations of Cryptography: vol. 2, Basic Applications," Cambridge University Press, 2009, 449 pages.
A. Odlyzko, "Privacy, Economics, and Price Discrimination on the Internet," International Conference on Electronic Commerce, Jul. 27, 2003, 16 pages.
Openlaw, "The Future of Derivatives: An End-to-End, Legally Enforceable Option Contract Powered by Ethereum," https://media.consensys.net/the-future-of-derivatives-an-end-to-end-legally-enforceable-option-contract-powered-by-ethereum-1c8c50005541, Dec. 5, 2018, 5 pages.
P. Paillier, "Public-Key Cryptosystems Based on Composite Degree Residuosity Classes," International Conference on the Theory and Application of Cryptographic Techniques, Eurocrypt 1999, May 2-6, 1999, pp. 223-238.
J. Peterson et al., "Augur: A Decentralized, Open-Source Platform for Prediction Markets," arXiv:1501.01042v2, Feb. 3, 2018, 19 pages.

The Chromium Projects, "SPDY: An Experimental Protocol for a Faster Web," https://dev.chromium.org/spdy/spdy-whitepaper, Accessed Aug. 25, 2020, 8 pages.
E. Rescorla, "The Transport Layer Security (TLS) Protocol Version 1.3," Internet Engineering Task Force, RFC 8446, Mozilla, Aug. 2018, 160 pages.
H. Ritzdorf et al., "TLS-N: Non-repudiation over TLS Enabling Ubiquitous Content Signing for Disintermediation," Network and Distributed System Security Symposium, Feb. 18-21, 2018, 16 pages.
J. Salowey et al., "AES Galois Counter Mode (GCM) Cipher Suites for TLS," Network Working Group RFC 5288, Cisco Systems, Inc., Aug. 2008, 16 pages.
P. Saxena et al., "SCRIPTGARD: Automatic Context-Sensitive Sanitization for Large-Scale Legacy Web Applications," ACM Conference on Computer and Communications Security, Oct. 17-21, 2011, 14 pages.
T. Scholte et al., "Quo Vadis? A Study of the Evolution of Input Validation Vulnerabilities in Web Application," Financial Cryptography and Data Security, Feb. 28-Mar. 4, 2011, 15 pages.
A. Sellars, "Twenty Years of Web Scraping and the Computer Fraud and Abuse Act," Boston University Journal of Science & Technology Law, Sep. 11, 2018, pp. 372-415.
R. Steinfeld et al., "Content Extraction Signatures," Proceedings of the 4th International Conference on Information Security and Cryptology, Apr. 28, 2003, 54 pages.
Y. Sun et al., "RAPTOR: Routing Attacks on Privacy in Tor," Proceedings of the 24th USENIX Security Symposium, Aug. 12-15, 2015, pp. 271-286.
J. Useem, "How Online Shopping Makes Suckers of Us All," The Atlantic, https://www.theatlantic.com/magazine/archive/2017/05/how-online-shopping-makes-suckers-of-us-all/521448/, May 2017, 15 pages.
L. Wang et al., "Blind Certificate Authorities," Proceedings of 40th IEEE Symposium on Security and Privacy, May 20-22, 2019, pp. 1015-1032.
Github, "EMP-Toolkit," https://github.com/emp-toolkit, Accessed Jan. 17, 2022, 3 pages.
X. Wang et al., "Authenticated Garbling and Efficient Maliciously Secure Two-Party Computation," Proceedings of the 2017 ACM SIGSAC Conference on Computer and Communications Security, Oct. 30, 2017, pp. 21-37.
A. C. Yao, "Protocols for Secure Computations," Proceedings of the 23rd Annual Symposium on Foundations of Computer Science, Nov. 1982, 5 pages.
J. Yasskin, "Signed HTTP Exchanges." https://datatracker.ietf.org/doc/html/draft-yasskin-http-origin-signed-responses-05, Jul. 27, 2019, 30 pages.
Github, "The C Based gRPC (C++, Python, Ruby, Objective-C, PHP, C#)" https://github.com/grpc/grpc, Accessed Jan. 27, 2022, 4 pages.
Github, "JSON for Modern C++," https://github.com/nlohmann/json, Accessed Jan. 27, 2022, 52 pages.
Github, "Minimal HTTP Processing Library," https://github.com/mendsley/tinyhttp, Accessed Jan. 27, 2022, 2 pages.
Github, "About Fast C++ Logging Library," https://github.com/gabime/spdlog, Accessed Jan. 27, 2022, 12 pages.
Github, "Protecting Cryptographic Signing Keys and Seed Secrets with Multi-Party Computation," https://github.com/unboundsecurity/blockchain-crypto-mpc, Accessed Jan. 27, 2022, 13 pages.
Github, "A High-level Framework for Developing Efficient zk-SNARK Circuits," https://github.com/akosba/xjsnark, Accessed Jan. 27, 2022, 8 pages.
Boost Software License, "Boost C++ Libraries," https://www.boost.org/, Accessed Jan. 27, 2022, 2 pages.
M. Bellare et al., "Keying Hash Functions for Message Authentication," 16th Annual International Cryptology Conference, Jun. 1996, 19 pages.
Y. Ishai et al., "Zero-Knowledge from Secure Multiparty Computation," Proceedings of the 39th Annual ACM Symposium on Theory of Computing, Jun. 11-13, 2007, 33 pages.

(56) References Cited

OTHER PUBLICATIONS

K. Zhang et al., "On Detection of Anomalous Routing Dynamics in BGP," International Conference on Research in Networking, May 9-14, 2004, 12 pages.
C. Kruegel et al., "Topology-Based Detection of Anomalous BGP Messages," International Workshop on Recent Advances in Intrusion Detection, Sep. 2003, 20 pages.
J. Bar-Ilan et al., "Non-Cryptographic Fault-Tolerant Computing in Constant Number of Rounds of Interaction," Proceedings of the Eighth Annual ACM Symposium on Principles of Distributed Computing, Jun. 1989, pp. 201-209.
H. Nissenbaum, "Privacy in Context: Technology, Policy, and the Integrity of Social Life," Stanford University Press, 2010, Introduction Only, 22 pages.
T. Doyle, "Helen Nissenbaum, Privacy in Context: Technology, Policy, and the Integrity of Social Life," Journal of Value Inquiry, vol. 45, Mar. 2011, pp. 97-102.
International Search Report and Written Opinion of PCT/US20/48344 dated Nov. 20, 2020.
Cisco, "Best BGP Route Network Monitoring Solution," https://www.thousandeyes.com/solutions/bgp-and-route-monitoring, Accessed Mar. 29, 2021, 6 pages.
Cisco, "BGPMon is Now Part of CrossworkCloud," https://bgpmon.net , Accessed Mar. 29, 2021, 1 page.
Cisco, "All Events for BGP Stream," https://bgpstream.com, Accessed Mar. 29, 2021, 409 pages.
Github, "libsnark," https://github.com/scipr-lab/libsnark, Accessed Aug. 24, 2020, 17 pages.
Openid, "The Internet Identity Layer," https://openid.net/connect/, Accessed Aug. 25, 2020, 4 pages.
tlsnotary.org, "TLSNotary—A Mechanism for Independently Audited https Sessions," https://tlsnotary.org/TLSNotary.pdf, Sep. 10, 2014, 10 pages.
Intersoft Consulting, "Art. 20 GDPR Right to Data Portability," https://gdpr-info.eu/art-20-gdpr/, Accessed Aug. 24, 2020, 1 page.
Wikipedia, "Binary Option," https://en.wikipedia.org/w/index.php?title=Binary_option&oldid=966481445, Jul. 7, 2020, 17 pages.
Provable Things Limited, "The Provable Blockchain Oracle for Modern DApps," https://provable.xyz, Accessed Aug. 24, 2020, 7 pages.
S. Tillich, "(Bristol Format) Circuits of Basic Functions Suitable For MPC and FHE," https://homes.esat.kuleuven.be/~nsmart/MPC/old-circuits.html, Accessed Aug. 24, 2020, 2 pages.
J. Adler et al., "ASTRAEA: A Decentralized Blockchain Oracle," arXiv:1808.00528v1, Aug. 1, 2018, 8 pages.
Github, "relic," https://github.com/relic-toolkit/relic, Accessed Aug. 25, 2020, 4 pages.
Github, "mbedtls," https://github.com/ARMmbed/MBEDTLS, Accessed Aug. 24, 2020, 10 pages.
J. Cassano, "What are Smart Contracts? Cryptocurrency's Killer App," https://www.fastcompany.com/3035723/sma%20rt-contracts-could-be-cryptocurrencys-killer-app, Sep. 17, 2014, 8 pages.
G. Ateniese et al., "Sanitizable Signatures," 10th European Symposium on Research in Computer Security, Sep. 12-14, 2005, 20 pages.
agechecker.net, "Simple and Secure Age Verification," https://agechecker.net, Accessed Aug. 24, 2020, 4 pages.
E. Ben-Sasson et al., "Succinct Non-Interactive Zero Knowledge for a von Neumann Architecture," USENIX Security, 2014, 37 pages.
R. Biddle et al., "Browser Interfaces and Extended Validation SSL Certificates: An Empirical Study," ACM Workshop on Cloud Computing Security, Jan. 2009, 12 pages.
S. Blake-Wilson et al., "Elliptic Curve Cryptography (ECC) Cipher Suites for Transport Layer Security," Network Working Group, RFC: 4492, May 2006, 35 pages.
F. Zuiderveen Borgesius et al., "Online Price Discrimination and EU Data Privacy Law," Journal of Consumer Policy, Jul. 15, 2017, 20 pages.

M. Brown et al., "Transport Layer Security (TLS) Evidence Extensions," https://tools.ietf.org/html/draft-housley-evidence-extns-01, Nov. 2006, 42 pages.
C. Brzuska et al., "Security of Sanitizable Signatures Revisited," Public-Key Cryptography, Lecture Notes in Computer Science, Springer-Verlag, 2009, 27 pages.
J. Van Bulck, "Foreshadow: Extracting the Keys to the Intel SGX Kingdom with Transient Out-of-Order Execution," Proceedings of the 27th USENIX Security Symposium, Aug. 15-17, 2018, 18 pages.
B. Bünz et al., "Bulletproofs: Short Proofs for Confidential Transactions and More," 2018 IEEE Symposium on Security and Privacy, May 20-24, 2018, 45 pages.
V. Buterin et al., "A Next-Generation Smart Contract and Decentralized Application Platform," Ethereum White Paper, 2014, 36 pages.
K. Butler et al., "A Survey of BGP Security Issues and Solutions," Proceedings of the IEEE, vol. 98, No. 1, Jan. 2010, pp. 100-122.
J. Camenisch et al., "Efficient Group Signature Schemes for Large Groups," Annual International Cryptology Conference, Aug. 17-21, 1997, pp. 410-424.
M. Campanelli et al., "Zero-Knowledge Contingent Payments Revisited: Attacks and Payments for Services," Proceedings of the 2017 ACM SIGSAC Conference on Computer and Communications Security, Oct. 2017, 28 pages.
R. Canetti, "Universally Composable Security: A New Paradigm for Cryptographic Protocols," https://eprint.iacr.org/2000/067, Feb. 11, 2020, 106 pages.
M. Cavage et al., "Signing HTTP Messages," Network Working Group, Internet-Draft, Apr. 24, 2019, 44 pages.
Lab CFTC, "A Primer on Smart Contracts," https://www.cftc.gov/sites/default/files/2018-11/LabCFTC_PrimerSmartContracts112718.pdf, Nov. 27, 2018, 32 pages.
A. Delignat-Lavaud et al., "Cinderella: Turning Shabby X. 509 Certificates into Elegant Anonymous Credentials with the Magic of Verifiable Computation," 2016 IEEE Symposium on Security and Privacy, May 22-26, 2016, 20 pages.
D. Demmler et al., "Automated Synthesis of Optimized Circuits for Secure Computation," Proceedings of the 22nd ACM SIGSAC Conference on Computer and Communications Security, Oct. 2015, 14 pages.
S. Deshpande et al., "An Online Mechanism for BGP Instability Detection and Analysis," IEEE Transactions on Computers, Nov. 2009, 16 pages.
T. Dierks et al., "The Transport Layer Security (TLS) Protocol Version 1.2," Network Working Group, Aug. 2008, 208 pages.
B. Dowling et al., "A Cryptographic Analysis of the TLS 1.3 Handshake Protocol Candidates," 22nd ACM Conference on Computer and Communications Security, Oct. 12-16, 2015, 49 pages.
M. Dworkin, "Recommendation for Block Cipher Modes of Operation: Galois/Counter Mode (GCM) and GMAC," Computer Security Division, Information Technology Laboratory, National Institute of Standards and Technology, Nov. 2007, 39 pages.
S. Ellis et al., "ChainLink: A Decentralized Oracle Network," https://link.smartcontract.com/whitepaper, Sep. 4, 2017, 38 pages.
Federal Trade Commission, "Price Discrimination: Robinson-Patman Violations," https://www.ftc.gov/tips-advice/competition-guidance/guide-antitrust-laws/price-discrimination-robinson-patman, Accessed Aug. 24, 2020, 2 pages.
R. Gennaro et al., "Fast Multiparty Threshold ECDSA with Fast Trustless Setup," 2018 ACM SIGSAC Conference, Oct. 2018, 28 pages.
P. Grubbs et al., "Message Franking via Committing Authenticated Encryption," Annual International Cryptology Conference, Aug. 2017, 43 pages.
D. Grune et al., "Parsing Techniques: A Practical Guide," Springer, 2010, 318 pages.
I. Hajjeh et al., "TLS Sign," https://tools.ietf.org/html/draft-hajjeh-tls-sign-04, TLS Working Group, Dec. 15, 2007, 12 pages.
C. Hazay et al., "A Note on Zero-Knowledge Proofs of Knowledge and the ZKPOK Ideal Functionality," Cryptology ePrint Archive, Report 2010/552, https://eprint.iacr.org/2010/552, Oct. 28, 2010, 7 pages.

(56) References Cited

OTHER PUBLICATIONS

M. Hofmann, "Court: Violating Terms of Service Is Not a Crime, But Bypassing Technical Barriers Might Be," Electronic Frontier Foundation, https://www.eff.org/deeplinks/2010/07/court-violating-terms-service-not-crime- bypassing, Jul. 21, 2010, 6 pages.
N. Howe, "A Special Price Just for You," https://www.forbes.com/sites/neilhowe/2017/11/17/a-special-price-just-for-you/#39b07e1b90b3, Nov. 17, 2017, 5 pages.
A. Juels et al. "Mixicles: Simple Private Decentralized Finance," https://chain.link/mixicles.pdf, Sep. 3, 2019, 46 pages.
G. Khoury, "Violation of a Website's Terms of Service is Not Criminal," Findlaw Blog Post, Jan. 24, 2018, 3 pages.
A. Kosba et al., "xJsnark: A Framework for Efficient Verifiable Computation," 2018 IEEE Symposium on Security and Privacy, May 21-23, 2018, pp. 944-961.
K. Bhargavan et al., "A Formal Treatment of Accountable Proxying Over TLS," IEEE Symposium on Security and Privacy, May 20-24, 2018, pp. 799-816.
F. Zhang et al., "DECO—Liberating Web Data Using Decentralized Oracles for TLS," ar.Xiv: 1909.00938v4, Aug. 18, 2020, 21 pages.

\* cited by examiner

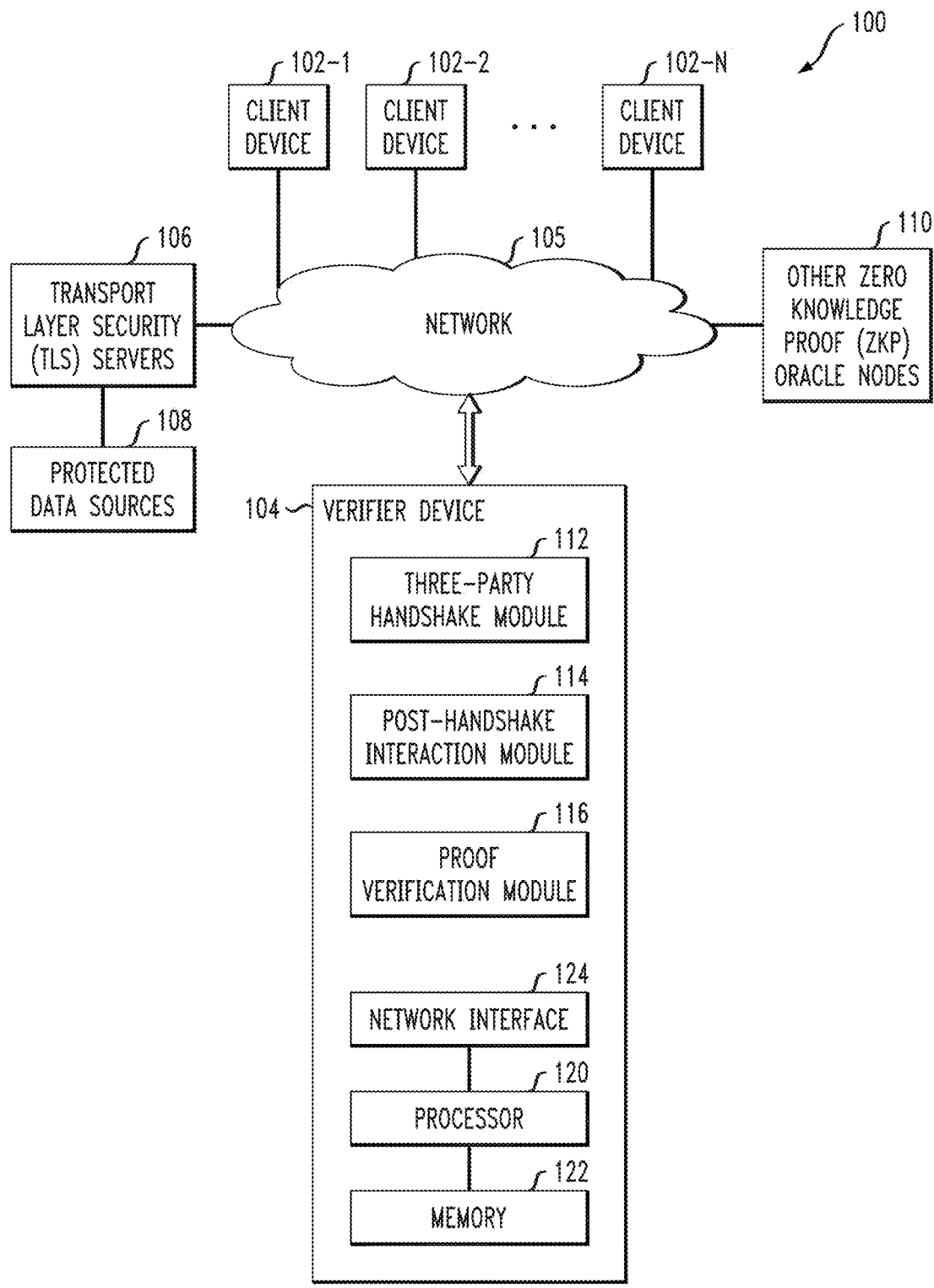

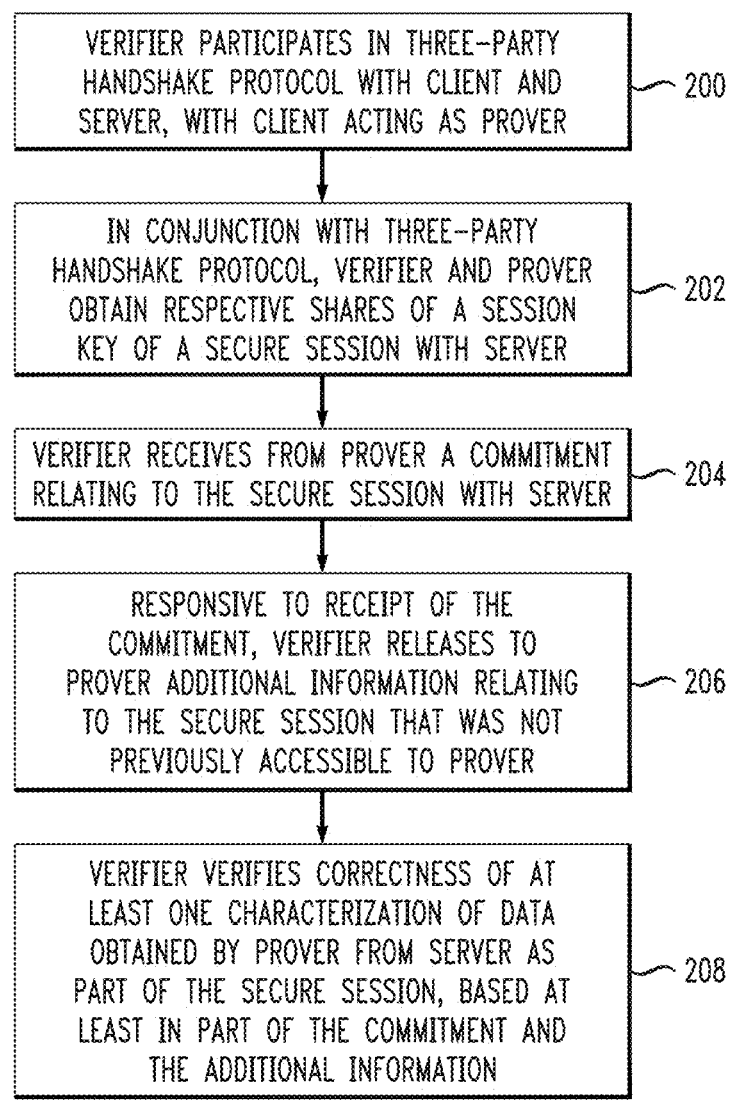

FIG. 3

Functionality $\mathcal{F}_{\text{Oracle}}$ between $\mathcal{S}$, $\mathcal{P}$ and $\mathcal{V}$

Input: The prover $\mathcal{P}$ holds some private input $\theta_S$. The verifier $\mathcal{V}$ holds a query template Query and a statement Stmt.

Functionality:
- If at any point during the session, a message (sid, receiver, $m$) with receiver $\in \{\mathcal{S}, \mathcal{P}, \mathcal{V}\}$ is received from $\mathcal{A}$, forward (sid, $m$) to receiver and forward any responses to $\mathcal{A}$.
- Upon receiving input (sid, Query, Stmt) from $\mathcal{V}$, send (sid, Query, Stmt) to $\mathcal{P}$. Wait for $\mathcal{P}$ to reply with "ok" and $\theta_S$.
- Compute $Q = \text{Query}(\theta_S)$ and send (sid, $Q$) to $\mathcal{S}$ and record its response (sid, $R$). Send (sid, $|Q|$, $|R|$) to $\mathcal{A}$.
- Send (sid, $Q$, $R$) to $\mathcal{P}$ and (sid, Stmt($R$), $\mathcal{S}$) to $\mathcal{V}$.

FIG. 4

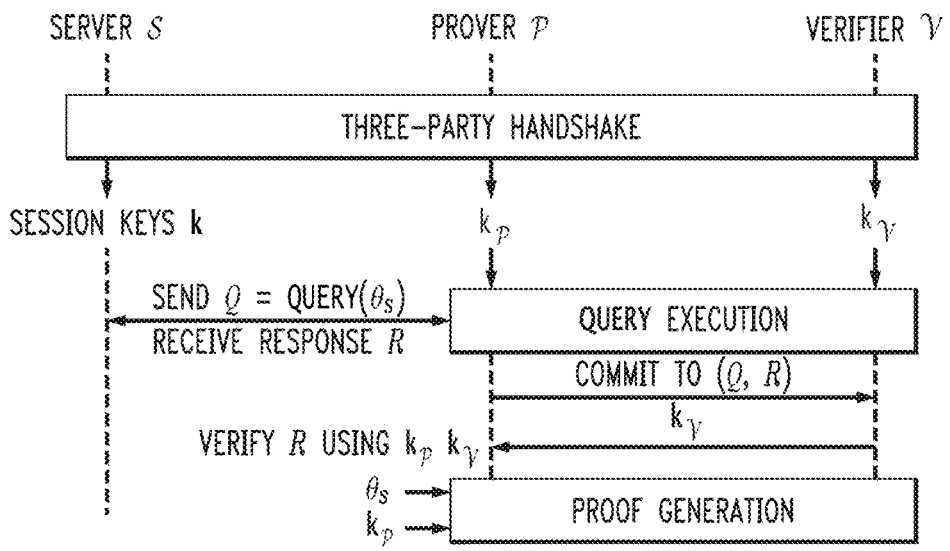

FIG. 5

```
1    {"name": "Bob",
2    "savings a/c": {
3         "balance": $5000
4    },
5    "checking a/c": {
6         "balance": $2000
7    },
8    "transactions": {...}}
```

FIG. 6

Prot$_{DECO}$

Prot$_S$: follow the standard TLS protocol.

Prot$_P$ and Prot$_V$:
- $V$ sends (sid, Query, Stmt) to $P$, where Query is the query template and Stmt the statement to be proven over the response to $P$.
- $P$ examines them and chooses whether to proceed. If so, $P$ starts the handshake.
- (3P-HS) $P$, $V$ execute the three-party handshake protocol. $P$ gets the encryption key $k^{Enc}$ and a share of the MAC key $k_P^{MAC}$, while $V$ gets the other share $k_V^{MAC}$.
- (Query) $P$ computes a query using the template $Q = \text{Query}(\theta_S)$. $P$ invokes 2PC-HMAC with $V$ to compute a tag $\tau$. $P$ sends (sid, $\hat{Q} = \text{Enc}(k^{Enc}, Q \| \tau)$) to $S$.
- (Commit and verify) After receiving a response (sid, $\hat{R}$) from $S$, $P$ sends (sid, $\hat{Q}, \hat{R}, k_P^{MAC}$) to $V$ as a commitment to the session data. After receiving (sid, $k_V^{MAC}$) from $V$, $P$ computes $k^{MAC} = k_V^{MAC} + k_P^{MAC}$, decrypts $R\|\tau = \text{Dec}(k^{Enc}, \hat{R})$, and verifies $\tau$ against $k^{MAC}$.
- (Proof gen) Let $b = \text{Stmt}(R)$, $x = (k^{Enc}, \theta_s, Q, R)$ and $w = (\hat{Q}, \hat{R}, k^{MAC}, b)$. $P$ sends (sid, "prove", $x, w$) to $\mathcal{F}_{ZK}$ and outputs $(Q, R)$. If $V$ receives (sid, "proof", 1, $(\hat{Q}, \hat{R}, \hat{k}^{MAC}, b)$) from $\mathcal{F}_{ZK}$, $V$ checks if $\hat{k}^{MAC} = k_P^{MAC} + k_V^{MAC}$. If so, $V$ outputs (sid, $b, S$).

The three-party handshake (3P-HS) protocol among $\mathcal{P}$, $\mathcal{V}$ and $\mathcal{S}$

Public information: Let $EC$ be the Elliptic Curve used in ECDHE over $\mathbb{F}_p$ with order $p$, $G$ a parameter, and $Y_S$ the server public key.

Output: $\mathcal{P}$ and $\mathcal{V}$ output $k_\mathcal{P}^{MAC}$ and $k_\mathcal{V}^{MAC}$ respectively, while the TLS server outputs $k^{MAC} = k_\mathcal{P}^{MAC} + k_\mathcal{V}^{MAC}$. Besides, both $\mathcal{S}$ and $\mathcal{P}$ outputs $k^{Enc}$.

---

TLS server $\mathcal{S}$: follow the standard TLS protocol.

Prover $\mathcal{P}$:

On initialization: $\mathcal{P}$ samples $r_c \leftarrow^\$ \{0, 1\}^{256}$ and sends ClientHello($r_c$) to $\mathcal{S}$ to start a standard TLS handshake.

On receiving ServerHello($r_s$), ServerKeyEx($Y$, $\sigma$, cert) from $\mathcal{S}$:

- $\mathcal{P}$ verifies that cert is a valid certificate and that $\sigma$ is a valid signature over $(r_c, r_s, Y_S)$ signed by a key contained in cert. $\mathcal{P}$ sends $(r_c, r_s, Y_S, \sigma, \text{cert})$ to $\mathcal{V}$.
- $\mathcal{V}$ checks cert and $\sigma$ similarly. $\mathcal{V}$ then samples $s_V \leftarrow^\$ \mathbb{F}_p$ and computes $Y_V = s_V \cdot G$. Send $Y_V$ to $\mathcal{P}$.
- $\mathcal{P}$ samples $s_p \leftarrow^\$ \mathbb{F}_p$ and computes $Y_P = s_p \cdot G$. Send ClientKeyEx($Y_P + Y_V$) to $\mathcal{S}$.
- $\mathcal{P}$ and $\mathcal{V}$ run ECtF to compute a sharing of the x-coordinate of $Y_P + Y_V$, denoted $z_P, z_V$.
- $\mathcal{P}$ (and $\mathcal{V}$) send $z_P$ (and $z_V$) to $\mathcal{F}_{2PC}^{hs}$ (specified below) to compute shares of session keys and the master secret. $\mathcal{P}$ receives ($k^{Enc}$, $k_\mathcal{P}^{MAC}$, $m_\mathcal{P}$), while $\mathcal{V}$ receives ($k_\mathcal{V}^{MAC}$, $m_\mathcal{V}$).
- $\mathcal{P}$ computes a hash (denoted $h$) of the handshake messages sent and received thus far, and runs 2PC-PRF with $\mathcal{V}$ to compute $s = \text{PRF}(m_\mathcal{P} \oplus m_\mathcal{V}, \text{"client finished"}, h)$ on the hash of the handshake messages and sends a Finished($s$) to $\mathcal{S}$.

On receiving other messages from $\mathcal{S}$:

- If it's Finished($s$), $\mathcal{P}$ and $\mathcal{V}$ run a 2PC to check $s \stackrel{?}{=} \text{PRF}(m_\mathcal{P} \oplus m_\mathcal{V}, \text{"server finished"}, h)$ and abort if not.
- Otherwise respond according to the standard TLS protocol.

---

$\mathcal{F}_{2PC}^{hs}$ with $\mathcal{P}$ and $\mathcal{V}$

Public Input: nonce $r_c, r_s$

Private Input: $z_P \in \mathbb{F}_p$ from $\mathcal{P}$; $z_V \in \mathbb{F}_p^2$ from $\mathcal{V}$

- $z := z_P + z_V$
- $m := \text{PRF}(z, \text{"master secret"}, r_c \| r_s)$ (truncate at 48 bytes)
- $k^{MAC}, k^{Enc} := \text{PRF}(m, \text{"key expansion"}, r_s \| r_c)$ // key expansion
- Sample $r_k, r_m \leftarrow^\$ \mathbb{F}_p$. Send ($k^{Enc}, r_k, r_m$) to $\mathcal{P}$, and ($r_k \oplus k^{MAC}, r_m \oplus m$) to $\mathcal{V}$ privately.

*FIG. 8*

---
ECtF between $\mathcal{P}$ and $\mathcal{V}$

Input: $P_1 = (x_1, y_1) \in EC(\mathbb{F}_p)$ from $\mathcal{P}$, $P_2 = (x_2, y_2) \in EC(\mathbb{F}_p)$ from $\mathcal{V}$.

Output: $\mathcal{P}$ and $\mathcal{V}$ output $s_1$ and $s_2$ such that $s_1 + s_2 = x$ where $(x, y) = P_1 + P_2$ in $EC$.

Protocol:
- $\mathcal{P}$ (and $\mathcal{V}$) sample $\rho_i \leftarrow^\$ \mathbb{Z}_p$ for $i \in \{1, 2\}$ respectively. $\mathcal{P}$ and $\mathcal{V}$ run $\alpha_1, \alpha_2 := \mathsf{MtA}((-x_1, \rho_1), (\rho_2, x_2))$.
- $\mathcal{P}$ computes $\delta_1 = -x_1 \rho_1 + \alpha_1$ and $\mathcal{V}$ computes $\delta_2 = x_2 \rho_2 + \alpha_2$.
- $\mathcal{P}$ (and $\mathcal{V}$) reveal $\delta_1$ (and $\delta_2$) to each other and compute $\delta = \delta_1 + \delta_2$.
- $\mathcal{P}$ (and $\mathcal{V}$) compute $\eta_i = \rho_i \cdot \delta^{-1}$ for $i \in \{1, 2\}$ respectively.
- $\mathcal{P}$ and $\mathcal{V}$ run $\beta_1, \beta_2 := \mathsf{MtA}((-y_1, \eta_1), (\eta_2, y_2))$.
- $\mathcal{P}$ computes $\lambda_1 = -y_1 \cdot \eta_1 + \beta_1$ and $\mathcal{V}$ computes $\lambda_2 = y_2 \cdot \eta_2 + \beta_2$. They run $\gamma_1, \gamma_2 := \mathsf{MtA}(\lambda_1, \lambda_2)$.
- $\mathcal{P}$ (and $\mathcal{V}$) computes $s_i = 2\gamma_i + \lambda_i^2 - x_i$ for $i \in \{1, 2\}$ respectively.
- $\mathcal{P}$ outputs $s_1$ and $\mathcal{V}$ outputs $s_2$.

---
2PC-HMAC between $\mathcal{P}$ and $\mathcal{V}$

Input: $\mathcal{P}$ inputs $k_\mathcal{P}^{MAC}$, $m$ and $\mathcal{V}$ inputs $k_\mathcal{V}^{MAC}$.

Output: $\mathcal{P}$ outputs $\mathsf{HMAC}(k^{MAC}, m)$ where $k^{MAC} = k_\mathcal{P}^{MAC} \oplus k_\mathcal{V}^{MAC}$.

One-time setup: $\mathcal{P}$ and $\mathcal{V}$ use 2PC to compute $s_0 = f(IV, k^{MAC} \oplus \mathsf{ipad})$ and reveal $s_0$ to $\mathcal{P}$.

To compute a tag for message $m$:
- $\mathcal{P}$ computes inner hash $h_i = f(s_0, m)$.
- $\mathcal{P}$ inputes $k_\mathcal{P}^{MAC}$, $h_i$ and $\mathcal{V}$ inputs $k_\mathcal{V}^{MAC}$ to 2PC which reveals $H(k^{MAC} \oplus \mathsf{opad} \| h_i)$ to both parties.

FIG. 10

Post-handshake protocols for GCM

Private input: $k_\mathcal{P}$ and $k_\mathcal{V}$ from $\mathcal{P}$ and $\mathcal{V}$ respectively. $k = k_\mathcal{P} + k_\mathcal{V}$ is the encryption key.

Protocol for preprocessing

On initialization: $\mathcal{P}$ (and $\mathcal{V}$) sends $k_\mathcal{P}$ and ($k_\mathcal{V}$) to $\mathcal{F}_{PP}$ and wait for output $\{h_{\mathcal{P},i}\}_i$ (and $\{h_{\mathcal{V},i}\}_i$).

---

$\mathcal{F}_{PP}$

After receiving $k_1, k_2$ from two parties, compute $h := AES(k_1 + k_2, 0)$. Sample $n$ random number $\{r_i\}_{i=1}^n$ and compute $\{h^i\}_{i=1}^n$ in $\mathbb{F}_{2^{128}}$. For $i \in [n]$, send $r_i$ to player 1 and $r_i \oplus h^i$ to player 2.

---

Protocol for decrypting TLS records

Prover $\mathcal{P}$:

On receiving a record $(IV, C, A, T)$ from $\mathcal{S}$:

- Let $X = A \| C \| \ell_A \| \ell_C$.
- Send $(k_\mathcal{P}, IV)$ to $\mathcal{F}_{AES\text{-}EqM}$ and wait for output $c_\mathcal{P}$.
- Send $(IV, X)$ to $\mathcal{V}$ and wait for the response $P$.
- Compute $T' = P + c_\mathcal{P} + \sum_i X_i\, h_{\mathcal{P},i}$ in $\mathbb{F}_{2^{128}}$.
- Abort if $T' \neq T$. Otherwise, compute $K$ such that $K_i = \text{inc}^i(IV)$ for $i \in [\ell_C]$. Send $(IV, \ell_C, \text{Decrypt})$ to $\mathcal{V}$.
- Send $(k_\mathcal{P}, K)$ to $\mathcal{F}_{AES\text{-}EqM\text{-}Asym}$ as party 1 and wait for output $K'$.
- Decrypt the message as $M_i = K'_i \oplus C_i$.

Verifier $\mathcal{V}$:

On receiving $(IV, X)$ from $\mathcal{P}$:

- If $IV$ found in store, abort. Otherwise store $IV$ and proceed.
- Send $(k_\mathcal{V}, IV)$ to $\mathcal{F}_{AES\text{-}EqM}$ and wait for output $c_\mathcal{V}$.
- Compute $P = c_\mathcal{V} + \sum_i X_i\, h_{\mathcal{V},i}$ in $\mathbb{F}_{2^{128}}$
- Send $P$ to $\mathcal{P}$.

On receiving $(IV, n, \text{Decrypt})$ from $\mathcal{P}$:

- Compute $K$ such that $K_i = \text{inc}^i(IV)$ for $i \in [n]$.
- Abort if any $K_i$ is found in store (as previously used IVs.)
- Send $(k_\mathcal{V}, K)$ to $\mathcal{F}_{AES\text{-}EqM\text{-}Asym}$ as party 2.

---

$\mathcal{F}_{AES\text{-}EqM}$

Wait for input $(k_i, m_i)$ from party $i$ for $i \in \{1, 2\}$. Abort if $m_1 \neq m_2$. Sample $r \leftarrow_\$ \mathbb{F}$. Compute $c = AES(k_1 \oplus k_2, m_1)$. Send $r$ to party 1 and $c \oplus r$ to party 2.

---

$\mathcal{F}_{AES\text{-}EqM\text{-}Asym}$

Wait for input $(k_i, m_i)$ from party $i$ for $i \in \{1, 2\}$. Abort if $m_1 \neq m_2$. Compute $c = AES(k_1 \oplus k_2, m_1)$. Send $c$ to party 1 and $\perp$ to party 2.

FIG. 12

```
<title>Demographic Data</title>
<span id='EMPLID'> 111111 </span>
<span id='NAME'> Alice </span>
<span id='BIRTHDATE'> 01/01/1990 </span> ...
```

FIG. 13

```
<table>
<tr>Order Placed : November 23, 2018</tr>
<tr>Order Total : $34.28</tr>
<tr>Items Ordered : Food Processor</tr>
</table>
...
<b> Shipping Address : </b>
<ul  class="displayAddressUL">
 <li   class="FullName"> Alice </li>
 <li   class="Address"> Wonderland </li>
 <li   class="City"> New York </li>
</ul>
```

*FIG. 14*

```
INPUT: Strings R, R'.
OUTPUT: True iff R' is a key-value pair and R' is in R CTX$_{u,s}$ (R, R') :
isPair = (*$\parser{\pairGram, {\sf k}}$*) (R')
if !isPair : // check if R' is a key-value pair
    return False
str = R$ // add special symbol $ to denote end of R
loc = 0
i = loc
j = loc
keyFound = false
stack.push($)
stack.push(S) // S is the start symbol
while stack is not empty :
    next = stack.pop ()
    if next is pair :
        if str[loc : loc + len(R')] == R' :
            keyFound = true
            loc += len(R')
    if next is terminal :
        if next != str[loc] :
            return (*$\bot$*) // R(*$\notin \unique$*).
            ↪ Invalid input
        else :
            if next == $ :
                return keyFound // End of R reached
            loc += 1
    else : // next on stack is a non-terminal
        prod = PTable[next][str[loc]]
        for production in reversed(prod) :
            stack.push(production)
```

DECENTRALIZED TECHNIQUES FOR VERIFICATION OF DATA IN TRANSPORT LAYER SECURITY AND OTHER CONTEXTS

CROSS-REFERENCE TO RELATED APPLICATION(S)

The present application claims priority to U.S. Provisional Patent Application Ser. No. 62/894,052, filed Aug. 30, 2019 and entitled "DECO: Decentralized Oracles for TLS," which is incorporated by reference herein in its entirety.

STATEMENT OF GOVERNMENT SUPPORT

This invention was made with U.S. government support under Grant Nos. CNS-1514163, CNS-1564102, CNS-1704615 and CNS-1933655 of the National Science Foundation (NSF), and Army Research Office (ARO) Grant No. W911NF161-0145. The U.S. government has certain rights in the invention.

FIELD

The field relates generally to information security, including, for example, techniques for proving that data is from a particular source or otherwise verifying correctness of data obtained in the context of transport layer security (TLS) and in other contexts.

BACKGROUND

Thanks to the widespread deployment of TLS, users can access private data over channels with end-to-end confidentiality and integrity. What they cannot do, however, is prove to third parties the provenance of such data, i.e., that it genuinely came from a particular website. Existing approaches either introduce undesirable trust assumptions or require server-side modifications. As a result, the value of users' private data is locked up in its point of origin.

SUMMARY

Illustrative embodiments provide decentralized oracles for TLS and in numerous other applications in which it is necessary or otherwise desirable to prove that data is from a particular source.

For example, some embodiments overcome the above-described disadvantages of existing approaches by providing a decentralized oracle, illustratively referred to herein as DECO, that allows users to prove that a piece of data accessed via TLS came from a particular website, and to optionally prove statements about such data in zero-knowledge, keeping the data itself secret. DECO can thus liberate data from centralized web-service silos, making it accessible to a rich spectrum of applications. Advantageously, DECO in illustrative embodiments works without trusted hardware or server-side modifications.

In one embodiment, an apparatus comprises a verifier device that includes a processor and a memory coupled to the processor. The verifier device is configured to communicate over one or more networks with a client device and a server device. The verifier device participates in a three-party handshake protocol with the client device and the server device in which the verifier device and the client device obtain respective shares of a session key of a secure session with the server device. The verifier device receives from the client device a commitment relating to the secure session with the server device, and responsive to receipt of the commitment, releases to the client device additional information relating to the secure session that was not previously accessible to the client device. The verifier device verifies correctness of at least one characterization of data obtained by the client device from the server device as part of the secure session, based at least in part on the commitment and the additional information.

It is to be appreciated that the foregoing arrangements are only examples, and numerous alternative arrangements are possible.

These and other embodiments of the invention include but are not limited to systems, methods, apparatus, processing devices, integrated circuits, and processor-readable storage media having software program code embodied therein.

BRIEF DESCRIPTION OF THE FIGURES

FIG. 1 shows an information processing system implementing decentralized oracles for TLS in an illustrative embodiment.

FIG. 2 is a flow diagram of a process for implementing a decentralized oracle for TLS in an illustrative embodiment.

FIG. 3 shows an example of decentralized oracle functionality in an illustrative embodiment.

FIG. 4 illustrates multiple phases of device interaction in a decentralized oracle implementation comprising a server device, a prover device and a verifier device in an illustrative embodiment.

FIG. 5 shows example data comprising bank statement information used to demonstrate selective opening and context-integrity attacks in an illustrative embodiment.

FIG. 6 shows a detailed view of one possible implementation of a decentralized oracle protocol in an illustrative embodiment.

FIG. 7 shows a detailed example of a three-party handshake protocol utilized in implementing a decentralized oracle in an illustrative embodiment.

FIG. 8 shows a protocol carried out between a prover device and a verifier device in establishing key shares in an illustrative embodiment.

FIGS. 9 and 10 show additional examples of protocols utilized in conjunction with implementation of decentralized oracles in illustrative embodiments.

FIGS. 12 and 13 show example data processed using respective reveal and redact modes of one or more decentralized oracles in illustrative embodiments.

FIG. 14 shows pseudocode for two-stage parsing of unique-key grammars in an illustrative embodiment.

DETAILED DESCRIPTION

Figure 11:
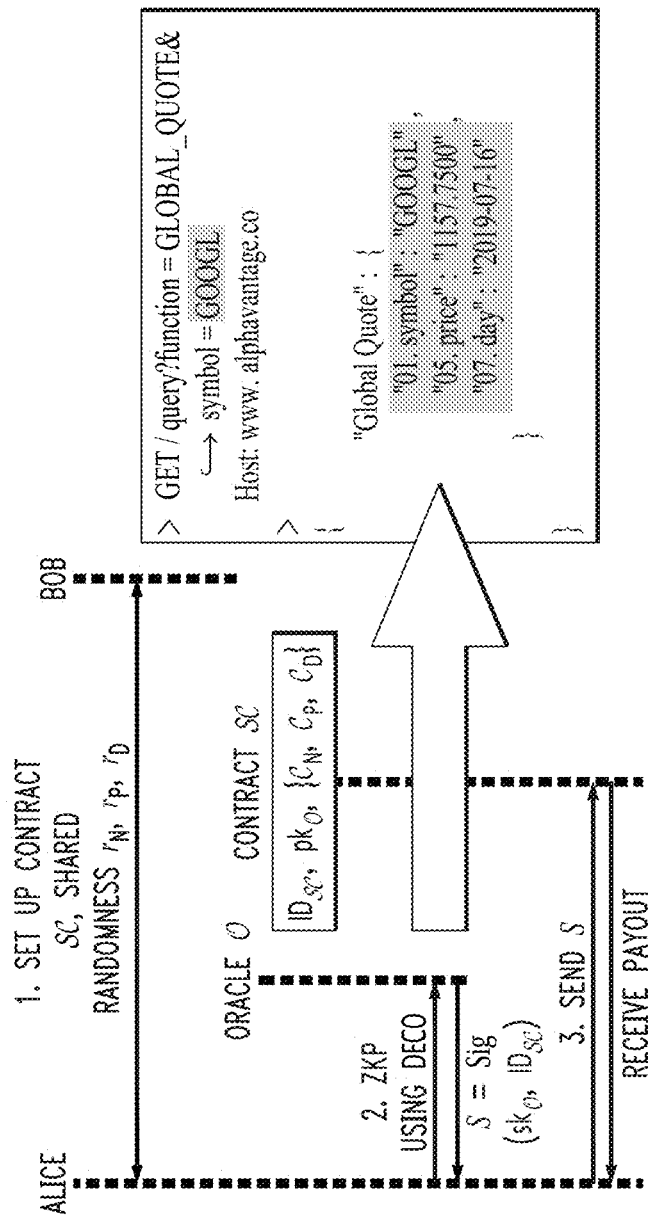
FIG. 11 shows a smart contract embodiment involving two parties in which one of the parties utilizes a decentralized oracle to obtain information that is provided to the smart contract.

Embodiments of the invention can be implemented, for example, in the form of information processing systems comprising computer networks or other arrangements of networks, clients, servers, processing devices and other components. Illustrative embodiments of such systems will be described in detail herein. It should be understood, however, that embodiments of the invention are more generally applicable to a wide variety of other types of information processing systems and associated networks, clients, servers, processing devices or other components. Accordingly, the term "information processing system" as used herein is intended to be broadly construed so as to encompass these and other arrangements.

FIG. 1 shows an information processing system 100 implementing decentralized oracles for TLS in an illustrative embodiment. The system 100 comprises a plurality of client devices 102-1, 102-2, . . . 102-N and a verifier device 104 which are configured to communicate over a network 105. A given one of the client devices 102 can comprise, for example, a laptop computer, tablet computer or desktop personal computer, a mobile telephone, or another type of computer or processing device, as well as combinations of multiple such devices. The verifier device 104 can similarly comprise various types of processing devices each including at least one processor and at least one memory coupled to the at least one processor.

The network 105 can illustratively include, for example, a global computer network such as the Internet, a wide area network (WAN), a local area network (LAN), a satellite network, a telephone or cable network, a cellular network such as a third generation (3G), fourth generation (4G) or fifth generation (5G) network, a wireless network implemented using a wireless protocol such as Bluetooth, WiFi or WiMAX, or various portions or combinations of these and other types of communication networks.

The system 100 further comprises a plurality of TLS servers 106 associated with respective protected data sources 108. The TLS servers 106 are illustratively configured to control access to their respective protected data sources 108. At least a subset of the protected data sources 108 illustratively comprise respective HTTPS-enabled websites, where HTTPS denotes Hypertext Transfer Protocol Secure, an extension of the Hypertext Transfer Protocol (HTTP). It is to be appreciated that a wide variety of additional or alternative data sources can be used in other embodiments. The protected data sources 108 of the system 100 are protected in the sense that they can be securely accessed via HTTPS through at least one of the TLS servers 106. Other data sources need not be accessible in this particular manner, and can implement additional or alternative access control mechanisms, and/or could be publicly accessible using other types of secure protocols.

Also, although illustrative embodiments herein utilize one or more servers of particular types, such as TLS servers 106, it is to be appreciated that other types of secure protocols can be used in other embodiments, and can be implemented in other types of server devices. The term "server device" as used herein is therefore intended to be broadly construed, and should not be viewed as being limited in any way to TLS servers.

The client devices 102 in some embodiments operate as respective prover devices relative to the verifier device 104 or other zero knowledge proof (ZKP) oracle nodes 110 of system 100. The verifier device 104 may therefore be viewed as a ZKP oracle node of the system 100. Accordingly, a given "verifier device" as that term is broadly used herein can comprise, for example, a particular oracle node of a set of oracle nodes of a decentralized oracle system such as system 100.

The particular numbers, types and arrangements of devices and other components in system 100 are presented by way of illustrative example only, and can be varied in other embodiments. For example, although only a single verifier device 104 is shown in this embodiment, other embodiments can include multiple verifier devices, as in an arrangement in which the other ZKP oracle nodes 110 operate as respective verifier devices. Also, one or more of the TLS servers 106 can each be configured to control access to multiple ones of the protected data sources 108. Numerous other decentralized oracle arrangements are possible.

The verifier device 104 comprises a three-party handshake module 112, a post-handshake interaction module 114, and a proof verification module 116. These modules implement respective distinct protocols of a decentralized oracle protocol, also referred to herein as a DECO protocol, as described in more detail below.

The verifier device 104 in the present embodiment further comprises a processor 120, a memory 122 and a network interface 124. The processor 120 is assumed to be operatively coupled to the memory 122 and to the network interface 124 via the simplified illustrative interconnections shown in the figure.

The processor 120 may comprise, for example, a microprocessor, an application-specific integrated circuit (ASIC), a field-programmable gate array (FPGA), a central processing unit (CPU), a graphics processing unit (GPU), an arithmetic logic unit (ALU), a digital signal processor (DSP), or other similar processing device component, as well as other types and arrangements of processing circuitry, in any combination. At least a portion of the functionality of a decentralized oracle provided by a given processing device as disclosed herein can be implemented using such circuitry.

The memory 122 stores software program code for execution by the processor 120 in implementing portions of the functionality of the processing device. For example, at least portions of the functionality of the modules 112, 114 and 116 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as static random access memory (SRAM), dynamic random access memory (DRAM), or other types of random access memory (RAM), read-only memory (ROM), flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or more of the client devices 102, verifier device 104, TLS servers 106 and other ZKP oracle nodes 110.

The network interface 124 is configured to allow the verifier device 104 to communicate over the network 105 with other system elements, and may comprise one or more conventional transceivers.

In operation, the verifier device 104 in illustrative embodiments is configured to participate in a three-party handshake protocol with a given one of the client devices 102, such as client device 102-1, and a given one of the TLS servers 106. Such participation is illustratively controlled by the three-party handshake module 112 of the verifier device 104. In conjunction with execution of the three-party handshake protocol, verifier device 104 and the client device 102-1 obtain respective shares of a session key of a secure session with the given TLS server. The secure session illustratively comprises a TLS session.

The verifier device 104 receives from the client device 102-1 a commitment relating to the secure session with the given TLS server. Responsive to receipt of the commitment, the verifier device 104 releases to the client device 102-1 additional information relating to the secure session that was not previously accessible to the client device 102-1. These operations relating to the commitment are illustratively performed under the control of the post-handshake interaction module 114.

The verifier device 104 verifies correctness of at least one characterization of data obtained by the client device 102-1 from the given TLS server as part of the secure session, based at least in part on the commitment and the additional information. Such verification is illustratively performed under the control of the proof verification module 116.

In some embodiments, the verifier device 104 is further configured to initiate one or more automated actions responsive to the verification of the correctness of the at least one characterization of the data obtained by the client device 102-1 from the given TLS server. For example, the verifier device 104 can return verification information or other related information to the client device 102-1.

By way of example, the commitment relating to the secure session may comprise a commitment to query response data obtained by the client device 102-1 from the given TLS server as part of the secure session.

As another example, the commitment relating to the secure session may comprise a commitment to a prover key established by the client device 102-1 in conjunction with the three-party handshake protocol but not previously accessible to the verifier device 104. Other types of commitments can be used in other embodiments.

The additional information released to the client device 102-1 responsive to receipt of the commitment in some embodiments comprises a verifier key established by the verifier device 104 in conjunction with the three-party handshake protocol but not previously accessible to the client device 102-1.

In other embodiments, the verifier device 104 is further configured to operate as a proxy for the client device 102-1 in conjunction with interactions between the client device 102-1 and the given TLS server, such that the verifier device 104 automatically obtains ciphertexts exchanged between the client device 102-1 and the given TLS server as part of the secure session via the verifier device 104 operating as the proxy. Such an embodiment is referred to herein as a "proxy mode" arrangement.

The verifier device 104 in some embodiments is further configured to receive from the client device 102-1 one or more statements characterizing the data obtained by the client device 102-1 from the given TLS server as part of the secure session.

For example, a given one of the one or more statements illustratively comprises a selectively-revealed substring of query response data obtained by the client device 102-1 from the given TLS server as part of the secure session.

As another example, a given one of the one or more statements is illustratively configured to provide context integrity through utilization of a multi-stage parsing protocol in which query response data obtained by the client device 102-1 from the given TLS server as part of the secure session is preprocessed by the client device 102-1 to generate reduced data that is subsequently parsed by the client device 102-1 in conjunction with generation of the given statement to be sent by the client device 102-1 to the verifier device 104.

A wide variety of other types of statements characterizing the data obtained by the client device 102-1 from the given TLS server as part of the secure session can be used in other embodiments.

In some embodiments, in conjunction with the three-party handshake protocol, the client device 102-1 and the verifier device 104 jointly establish one or more shared session keys with the given TLS server, with the client device 102-1 having a first share of a given one of the one or more shared session keys, the verifier device 104 having a second share of the given shared session key, and the given TLS server having a composite session key combining the first and second shares.

Additionally or alternatively, in conjunction with the three-party handshake protocol, the client device 102-1 receives from the given TLS server an encryption key that is not accessible to the verifier device 104.

In some embodiments, the verifier device 104 and the client device 102-1 collaborate using their respective shares of the session key of the secure session with the given TLS server to generate a query that is provided by the client device 102-1 to the given TLS server to request that the given TLS server send the data to the client device 102-1.

The verifier device 104 and the client device 102-1 can similarly collaborate using their respective shares of the session key of the secure session with the given TLS server to validate a response that is provided by the given TLS server to the client device 102-1 responsive to the query.

In some embodiments, in conjunction with the three-party handshake protocol, the client device 102-1 and the verifier device 104 establish respective prover and verifier keys. In such an embodiment, verifying correctness of at least one characterization of data obtained by the client device 102-1 from the given TLS server as part of the secure session illustratively comprises verifying a proof provided by client device 102-1 to the verifier device 104. The proof is illustratively generated by the client device 102-1 based at least in part on (i) the prover key established by the client device 102-1 in conjunction with the three-party handshake protocol, (ii) the verifier key established by the verifier device 104 in conjunction with the three-party handshake protocol, and (iii) secret information of the client device 102-1, such as a password or passcode.

In some embodiments, verifying correctness of at least one characterization of data obtained by the client device 102-1 from the given TLS server as part of the secure session illustratively comprises obtaining data derived from at least a portion of at least one ciphertext of the secure session, and verifying correctness of at least one characterization of that data by the client device 102-1. The term "ciphertext" as used in this context and elsewhere herein is intended to be broadly construed, and should not be viewed as requiring the use of any particular cryptographic protocol.

It is to be appreciated that the particular arrangement of components and other system elements shown in FIG. 1, and their associated processing operations as described above, are presented by way of illustrative example only, and numerous alternative embodiments are possible.

For example, although the verifier device 104 in the system 100 is illustratively shown as a single processing device comprising a processor coupled to a memory, the verifier device in other embodiments can comprise a distributed verifier device in which functionality of the verifier device 104 is distributed across multiple distinct processing devices. In such embodiments, the role of the verifier in various protocols disclosed herein can be distributed across multiple distinct parties executing a multi-party protocol, with each such party being associated with a different one of the multiple processing devices of the distributed verifier device. The term "device" as used herein is therefore intended to be broadly construed, so as to encompass at least one processing device comprising a processor coupled to a memory, and therefore multiple such processing devices as in the case of the distributed verifier device.

FIG. 2 shows an exemplary process, illustratively implemented at least in part by the verifier device 104 interacting with one of the client devices 102 as a prover with respect to data controlled by one of the TLS servers 106. It is to be understood that this particular process is only an example, and additional or alternative processes can be performed at least in part by prover, verifier and server entities in other embodiments.

In this embodiment, the process illustratively comprises steps 200 through 208. As noted above, at least portions of these steps are assumed to be performed at least in part by verifier device 104 interacting with one of the client devices 102 and further involving one of the TLS servers 106. These components are also referred to in the context of the FIG. 2 process as verifier, prover and server, respectively.

In step 200, the verifier participates in a three-party handshake protocol with the client and the server, with the client acting as the prover.

In step 202, in conjunction with the three-party handshake protocol, the verifier and the prover obtain respective shares of a session key of a secure session with the server.

In step 204, the verifier receives from the prover a commitment relating to the secure session with the server.

In step 206, responsive to receipt of the commitment, the verifier releases to the prover additional information relating to the secure session that was not previously accessible to the prover.

In step 208, the verifier verifies correctness of at least one characterization of data obtained by the prover from the server as part of the secure session, based at least in part on the commitment and the additional information.

Numerous other techniques can be used in association with implementation of decentralized oracles as disclosed herein.

Accordingly, the particular processing operations and other functionality described in conjunction with the flow diagram of FIG. 2 are presented by way of illustrative example only, and should not be construed as limiting the scope of the invention in any way. Alternative embodiments can use other types of processing operations involving verifier devices, prover devices and server devices. For example, the ordering of the process steps may be varied in other embodiments, or certain steps may be performed concurrently with one another rather than serially. Also, multiple instances of the process may be performed in parallel with one another within system 100 for different sets of respective prover, verifier and server devices. Accordingly, system 100 can simultaneously implement a large number of decentralized oracles using the techniques disclosed herein.

Additional aspects of illustrative embodiments will now be described with reference to FIGS. 3 through 14.

The widespread deployment of TLS allows users to access private data over channels with end-to-end confidentiality and integrity. What they cannot readily do under conventional practice, however, is prove to third parties the provenance of such data, i.e., that it genuinely came from a particular website. Existing approaches either introduce undesirable trust assumptions or require server-side modifications.

As a result, users' private data is locked up at its point of origin. Users cannot export their data in an integrity-protected way to other applications without help and permission from the current data holder.

Illustrative embodiments herein provide techniques referred to as DECO (short for decentralized oracle) to address these and other problems. DECO allows users to prove that a piece of data accessed via TLS came from a particular website and optionally prove statements about such data in zero-knowledge, keeping the data itself secret. Advantageously, DECO in illustrative embodiments can be implemented without the need for trusted hardware or server-side modifications.

DECO can liberate data from centralized web-service silos, making it accessible to a rich spectrum of applications. To demonstrate the power of DECO, we implement three applications that are hard to achieve without it: a private financial instrument using smart contracts, converting legacy credentials to anonymous credentials, and verifiable claims against price discrimination.

It is to be appreciated that these and other references to DECO herein refer to illustrative embodiments, and the particular features, functionality, advantages and other details of those embodiments should not be construed as limiting in any way. Alternative embodiments can implement additional or alternative techniques for verifying data sources in TLS and other contexts.

As indicated above, TLS is a powerful, widely deployed protocol that allows users to access web data over confidential, integrity-protected channels. But TLS has a serious limitation: it doesn't allow a user to prove to third parties that a piece of data she has accessed authentically came from a particular website. As a result, data use is often restricted to its point of origin, curtailing data portability by users, a right acknowledged by recent regulations such as the General Data Protection Regulation (GDPR).

Specifically, when a user accesses data online via TLS, she cannot securely export it, without help (hence permission) from the current data holder. Vast quantities of private data are thus intentionally or unintentionally locked up in the "deep web"—the part of the web that isn't publicly accessible.

To better appreciate the problem, consider an example in which Alice wants to prove to Bob that she's over 18. Currently, age verification services typically require users to upload IDs and detailed personal information, which raises privacy concerns. But various websites, such as company payroll records or Department of Motor Vehicles (DMV) websites, in principle store and serve verified birth dates. Alice could send a screenshot of her birth date from such a site, but this is easily forged. And even if the screenshot could somehow be proven authentic, it would leak information—revealing her exact birth date, not just that she's over 18.

Initially proposed to prove provenance of online data to smart contracts, oracles are a step towards exporting TLS-protected data to other systems with provenance and integrity assurances. Existing schemes, however, have serious technical limitations. They either only work with deprecated TLS versions and offer no privacy from the oracle (e.g., TLSNotary) or rely on trusted hardware (e.g., Town Crier), against which various attacks have recently emerged. Another class of oracle schemes assumes server-side cooperation, mandating that servers install TLS extensions or change application-layer logic. Server-facilitated oracle schemes suffer from two fundamental problems. First, they break legacy compatibility, causing a significant barrier to wide adoption. Moreover, such solutions only provide conditional exportability because the web servers have the sole discretion to determine which data can be exported, and can censor export attempts at will. A mechanism that allows users to export any data they have access to would enable a whole host of currently unrealizable applications.

To address the above problems, illustrative embodiments disclosed herein provide an arrangement referred to as DECO, a decentralized oracle for TLS. Unlike oracle schemes that require per-website support, DECO is illustratively source-agnostic and supports any website running standard TLS. Unlike solutions that rely on websites' participation, DECO requires no server-side cooperation. Thus a single instance of DECO could enable anyone to become an oracle for any website.

DECO makes rich Internet data accessible with authenticity and privacy assurances to a wide range of applications, including ones that cannot access the Internet such as smart contracts. DECO could fundamentally shift today's model of web data dissemination by providing private data delivery with an option for transfer to third parties or public release. This technical capability highlights potential future legal and regulatory challenges, but also anticipates the creation and delivery of appealing new services. Importantly, DECO does not require trusted hardware, unlike some alternative approaches.

In some embodiments, at a high level, the prover commits to a piece of data D and proves to the verifier that D came from a TLS server $\mathcal{S}$ and optionally a statement $\pi_D$ about D. With reference again to the example of proving age, the statement $\pi_D$ could be the predicate "D=y/m/d is Alice's date of birth and the current date—D is at least 18 years."

Informally, DECO achieves authenticity—that the verifier is convinced only if the asserted statement about D is true and D is indeed obtained from TLS server $\mathcal{S}$. DECO also provides privacy in that the verifier only learns that the statement $\pi_D$ holds for some D obtained from $\mathcal{S}$.

Designing DECO with the required security and practical performance, while using legacy TLS compatible primitives, introduces several important technical challenges. One challenge stems from the fact that TLS generates symmetric encryption and authentication keys that are shared by the client (e.g., prover in DECO) and web server. Thus, the client can forge arbitrary TLS session data, in the sense of signing the data with valid authentication keys.

To address this challenge, DECO introduces a novel three-party handshake protocol among the prover, verifier, and web server that creates an unforgeable commitment by the prover to the verifier on a piece of TLS session data D. The verifier can check that D is authentically from the TLS server. From the prover's perspective, the three-party handshake preserves the security of TLS in the presence of a malicious verifier.

Efficient selective opening. After committing to D, the prover proves statements about the commitment. Although arbitrary statements can be supported in theory, we optimize for what are likely to be the most popular applications— revealing only substrings of the response to the verifier. We call such statements selective opening. Fine-grained selective opening allows users to hide sensitive information and reduces the input length to the subsequent proofs.

A naïve solution would involve expensive verifiable decryption of TLS records using generic zero-knowledge proofs (ZKPs), but illustrative embodiments herein achieve an orders-of-magnitude efficiency improvement by exploiting the TLS record structure. For example, a direct implementation of verifiable decryption of a TLS record would involve proving correct execution of a circuit of 1024 Advanced Encryption Standard (AES) invocations in zero-knowledge, whereas by leveraging the Message Authentication Code-then-encrypt (MAC-then-encrypt) structure of Cipher Block Chaining-Hash-based Message Authentication Code (CBC-HMAC), illustrative embodiments herein can accomplish the same with only 3 AES invocations.

Context integrity. Selective opening allows the prover to only reveal a sub string D' of the server's response D. However, a sub string may mean different things depending on when it appears and a malicious prover could cheat by quoting out of context. Therefore we need to prove not just that D' appears in D, but that it appears in the expected context, i.e., D' has context integrity with respect to D. (Note that this differs from "contextual integrity" in privacy theory.)

Context-integrity attacks can be thwarted if the session content is structured and can be parsed. Fortunately most web data takes this form (e.g., in JavaScript Object Notation (JSON) or Hypertext Markup Language (HTML)). A generic solution is to parse the entire session and prove that the revealed part belongs to the necessary branch of a parse tree. But, under certain constraints that web data generally satisfies, parsing the entire session is not necessary. Some embodiments disclosed herein provide a novel two-stage parsing scheme where the prover pre-processes the session content, and only parses the outcome that is usually much smaller. We draw from the definition of equivalence of programs, as used in programming language theory, to build a formal framework to reason about the security of two-stage parsing schemes. Illustrative embodiments disclosed herein provide several practical realizations for specific grammars. Our definitions and constructions generalize to other oracles too. For example, it could prevent a generic version of a content-hidden attack.

With regard to implementation and evaluation of illustrative embodiments, we designed and implemented DECO as a complete end-to-end system. To demonstrate the system's power, we implemented three applications: 1) a confidentiality-preserving financial instrument using smart contracts; 2) converting legacy credentials to anonymous credentials; and 3) verifiable claims against price discrimination.

Our experiments with these applications show that DECO is highly efficient. For example, for TLS 1.2 in the WAN setting, online time is 2.85 s to perform the three-party handshake and 2.52 s for 2PC query execution. It takes about 3 s to 13 s to generate zero-knowledge proofs for the applications described above. More details are provided elsewhere herein.

DECO as disclosed in conjunction with illustrative embodiments to be described in detail below advantageously provides a provably secure decentralized oracle scheme. DECO in some embodiments provides an oracle scheme for modern TLS versions that doesn't require trusted hardware or server-side modifications.

We also describe in detail below a broad class of statements for TLS records that can be proven efficiently in zero-knowledge using DECO. Such statements allow users to open only substrings of a session-data commitment. The optimizations achieve substantial efficiency improvement over generic ZKPs.

With regard to context-integrity attacks and mitigation, we identify a new class of context-integrity attacks universal to privacy-preserving oracles, and we describe our mitigation approach involving a novel, efficient two-stage parsing scheme.

Transport Layer Security (TLS)

We now provide some background on TLS handshake and record protocols on which DECO builds in illustrative embodiments.

TLS is a family of protocols that provides privacy and data integrity between two communicating applications. Roughly speaking, it consists of two protocols: a handshake protocol that sets up the session using asymmetric cryptography, establishing shared client and server keys for the next protocol, the record protocol, in which data is transmitted with confidentiality and integrity protection using symmetric cryptography.

Handshake. In the handshake protocol, the server and client first agree on a set of cryptographic algorithms (also known as a cipher suite). They then authenticate each other (client authentication optional), and finally securely compute a shared secret to be used for the subsequent record protocol.

DECO in illustrative embodiments utilizes elliptic curve Diffie-Hellman (DH) key exchange with ephemeral secrets (ECDHE), although this is by way of example rather than limitation.

Record Protocol. To transmit application-layer data (e.g., HTTP messages) in TLS, the record protocol first fragments the application data D into fixed sized plaintext records $D=(D_1, \ldots, D_n)$. Each record is usually padded to a multiple of blocks (e.g., 128 bits). The record protocol then optionally compresses the data, applies a MAC, encrypts, and transmits the result. Received data is decrypted, verified, decompressed, reassembled, and then delivered to higher-level protocols. The specific cryptographic operations depend on the negotiated cipher suite. DECO supports the Advanced Encryption Standard (AES) cipher in two commonly used modes: CBC-HMAC and GCM, where CBC-HMAC denotes Cipher Block Chaining—Hash-based Message Authentication Code, and GCM denotes Galois/Counter Mode. Additional details regarding these and other aspects of TLS can be found in, for example, T. Dierks and E. Rescorla, "The Transport Layer Security (TLS) Protocol Version 1.2," RFC 5246, 2008, which is incorporated by reference herein. Again, other protocols can be used in other embodiments.

Differences Between TLS 1.2 and 1.3. In some embodiments herein we focus on TLS 1.2, and later describe how to generalize our techniques to TLS 1.3. Here we briefly note the major differences between these two TLS versions. TLS 1.3 removes the support for legacy non-authenticated encryption with additional data (non-AEAD) ciphers. The handshake flow has also been restructured. All handshake messages after the ServerHello are now encrypted. Finally, a different key derivation function is used. Additional details can be found in E. Rescorla, "The Transport Layer Security (TLS) Protocol Version 1.3," RFC 8446, 2018, which is incorporated by reference herein.

Multi-Party Computation

Consider a group of n parties $\mathcal{P}_1, \ldots, \mathcal{P}_n$, each of whom holds some secret $s_i$. Secure multi-party computation (MPC) allows them to jointly compute $f(s_i, \ldots, s_n)$ without leaking any information other than the output of f, i.e., $\mathcal{P}_i$ learns nothing about $s_{j \neq i}$. Security for MPC protocols generally considers an adversary that corrupts t players and attempts to learn the private information of an honest player. Two-party computation (2PC) refers to the special case of n=2 and t=1.

There are two general approaches to 2PC protocols. Garbled-circuit protocols encode f as a boolean circuit, an approach best-suited for bitwise operations (e.g., SHA-256 where SHA denotes Secure Hash Algorithm). Other protocols leverage threshold secret sharing and are best suited for arithmetic operations. The functions we compute in some embodiments using 2PC, though, include both bitwise and arithmetic operations. We separate them into two components, and use an optimized garbled-circuit protocol for the bitwise operations and a secret-sharing based multiplication-to-addition (MtA) protocol for the arithmetic operations. Additional details regarding an example optimized garbled-circuit protocol used in illustrative embodiments can be found in Xiao Wang, Samuel Ranellucci, and Jonathan Katz, "Authenticated Garbling and Efficient Maliciously Secure Two-Party Computation," in Association for Computing Machinery Conference on Computer and Communications Security (ACM CCS), 2017, which is incorporated by reference herein. Additional details regarding an example secret-sharing based MtA protocol used in illustrative embodiments can be found in Rosario Gennaro and Steven Goldfeder, "Fast multiparty threshold ECDSA with fast trustless setup," in ACM CCS, 2018, which is incorporated by reference herein. These are only examples, and other types of protocols can be used in other embodiments.

We now state a problem that is solved by illustrative embodiments of DECO and present a high-level overview of its architecture.

Problem Statement: Decentralized Oracles

Illustrative embodiments herein provide protocols for building "oracles," i.e., entities that can prove provenance and properties of online data. The goal is to allow a prover $\mathcal{P}$ to prove to a verifier $\mathcal{V}$ that a piece of data came from a particular website $\mathcal{S}$ and optionally prove statements about such data in zero-knowledge, keeping the data itself secret. Accessing the data may require private input (e.g., a password) from $\mathcal{P}$ and such private information should be kept secret from $\mathcal{V}$ as well.

We focus in illustrative embodiments on servers running TLS, a widely deployed security protocol suite on the Internet. However, TLS alone does not prove data provenance. Although TLS uses public-key signatures for authentication, it uses symmetric-key primitives to protect the integrity and confidentiality of exchanged messages, using a shared session key established at the beginning of each session. Hence $\mathcal{P}$, who knows this symmetric key, cannot prove statements about cryptographically authenticated TLS data to a third party.

A web server itself could assume the role of an oracle, e.g., by simply signing data. However, server-facilitated oracles would not only incur a high adoption cost, but also put users at a disadvantage: the web server could impose arbitrary constraints on the oracle capability. We are interested in a scheme where anyone can prove provenance of any data she can access, without needing to rely on a single, central point of control, such as the web server providing the data.

We address these and other challenges in illustrative embodiments by introducing what we refer to herein as "decentralized oracles" that don't rely on trusted hardware or cooperation from web servers. The problem is much more challenging than for previous oracles, as it precludes solutions that require servers to modify their code or deploy new software, or use of prediction markets, while at the same time going beyond these previous approaches by supporting proofs on arbitrary predicates over data.

Authenticated data feeds for smart contracts. An important application of illustrative embodiments disclosed herein is in constructing authenticated data feeds (ADFs), i.e., data with verifiable provenance and correctness, for smart contracts. A wide variety of other applications are advantageously supported by the techniques disclosed herein.

In the context of ADFs, since smart contracts can't participate in 2PC protocols, they must rely on oracle nodes to participate as $\mathcal{V}$ on their behalf. Therefore, in some embodiments, we deploy DECO in a decentralized oracle network, where a set of independently operated oracles are available for smart contracts to use. Note that oracles running DECO are trusted only for integrity, not for privacy. Smart contracts can further hedge against integrity failures by querying multiple oracles and requiring, e.g., majority agreement. We emphasize that DECO's privacy is preserved even if all oracles are compromised. Thus DECO enables users to provide ADFs derived from private data to smart contracts while hiding private data from oracles.

Notation and Definitions

In some embodiments, we use $\mathcal{P}$ to denote the prover, $\mathcal{V}$ the verifier and $\mathcal{S}$ the TLS server. We use letters in boldface (e.g., M) to denote vectors and $M_i$ to denote the ith element in M.

We model the essential properties of an oracle using an ideal functionality $\mathcal{F}_{Oracle}$ as illustrated in FIG. 3. To separate parallel runs of $\mathcal{F}_{Oracle}$, all messages are tagged with a unique session id denoted sid. Additional or alternative oracle properties can be used in other embodiments.

As indicated in FIG. 3, $\mathcal{F}_{Oracle}$ in this embodiment accepts a secret parameter $\theta_s$ (e.g., a password) from $\mathcal{P}$, a query template Query and a statement Stmt from $\mathcal{V}$. A query template is a function that takes $\mathcal{P}$'s secret $\theta_s$ and returns a complete query, which contains public parameters specified by $\mathcal{V}$. An example query template would be Query($\theta_s$) = "stock price of GOOG on Jan. 1, 2020 with application programming interface (API) key=$\theta_s$". The prover $\mathcal{P}$ can later prove that the query sent to the server is well-formed, i.e., built from the template, without revealing the secret. The statement Stmt is a function that $\mathcal{V}$ wishes to evaluate on the server's response. Following the previous example, as the response R is a number, the following statement would compare it with a threshold: Stmt(R)="R>$1,000".

After $\mathcal{P}$ acknowledges the query template and the statement (by sending "ok" and $\theta_s$), $\mathcal{F}_{Oracle}$ retrieves a response R from $\mathcal{S}$ using a query built from the template. We assume an honest server, so R is the ground truth. $\mathcal{F}_{Oracle}$ sends Stmt(R) and the data source to $\mathcal{V}$.

We are interested in this embodiment in decentralized oracles that don't require any server-side modifications or cooperation, i.e., $\mathcal{S}$ follows the unmodified TLS protocol. More particularly, a decentralized oracle protocol for TLS is a three-party protocol Prot=( Prot$_\mathcal{S}$, Prot$_\mathcal{P}$, Prot$_\mathcal{V}$) such that 1) Prot realizes $\mathcal{F}_{Oracle}$ and 2) Prot$_\mathcal{S}$ is the standard TLS, possibly along with an application-layer protocol.

Adversarial Model and Security Properties. In illustrative embodiments, we consider a static, malicious network adversary $\mathcal{A}$. Corrupted parties may deviate arbitrarily from the protocol and reveal their states to $\mathcal{A}$. As a network adversary, $\mathcal{A}$ learns the message length from $\mathcal{F}_{Oracle}$ since TLS is not length-hiding. We assume $\mathcal{P}$ and $\mathcal{V}$ choose and agree on an appropriate query (e.g., it should be idempotent for most applications) and statement according to the application-layer protocol run by $\mathcal{S}$.

For a given query $Q$, denote the server's honest response by $S(Q)$. We require that security holds when either $\mathcal{P}$ or $\mathcal{V}$ is corrupted. The functionality $\mathcal{F}_{Oracle}$ reflects the following security guarantees:

Prover-integrity: A malicious $\mathcal{P}$ cannot forge content provenance, nor can she cause $\mathcal{S}$ to accept invalid queries or respond incorrectly to valid ones. Specifically, if the verifier inputs (Query, Stmt) and outputs (b, $\mathcal{S}$), then $\mathcal{P}$ must have sent $Q$=Query($\theta_s$) to S in a TLS session, receiving response R=S($Q$) such that b=Stmt (R).

Verifier-integrity: A malicious $\mathcal{V}$ cannot cause $\mathcal{P}$ to receive incorrect responses. Specifically, if $\mathcal{P}$ outputs (Q, R) then R must be the server's response to query $Q$ submitted by $\mathcal{P}$, i.e., R=S($Q$).

Privacy: A malicious $\mathcal{V}$ learns only public information (Query, $\mathcal{S}$) and the evaluation of Stmt(R).

A Strawman Protocol

We focus in illustrative embodiments on two widely used representative TLS cipher suites: CBC-HMAC and AES-GCM. Our technique generalizes to other ciphers (e.g., Chacha20-Poly1305, etc.) as well. We initially use CBC-HMAC to illustrate certain embodiments, and later describe the techniques for AES-GCM.

TLS uses separate keys for each direction of communication. Unless explicitly specified, we don't distinguish between the two and use $k^{Enc}$ and $k^{MAC}$ to denote session keys for both directions.

In presenting illustrative embodiments of DECO, we start with a strawman protocol and incrementally build up to the full protocol.

A strawman protocol that realizes $\mathcal{F}_{Oracle}$ between ($\mathcal{P}$, $\mathcal{V}$) is as follows. $\mathcal{P}$ queries the server $\mathcal{S}$ and records all messages sent to and received from the server in $\hat{Q}$= ($\hat{Q}_1, \ldots, \hat{Q}_n$) and $\hat{R}$=($\hat{R}_1, \ldots, \hat{R}_n$), respectively. Let $\hat{M}$=( $\hat{Q}$, $\hat{R}$) and ($k^{MAC}$, $k^{Enc}$) be the session keys.

She then proves in zero-knowledge that 1) each $\hat{R}_i$ decrypts to $R_i \| \sigma_i$, a plaintext record and a MAC tag; 2) each MAC tag $\sigma_i$ for $R_i$ verifies against $k^{MAC}$; and 3) the desired statement evaluates to b on the response, i.e., b=Stmt(R). Using the standard notation, $\mathcal{P}$ computes $p_r$=ZK-PoK{$k^{Enc}$, R:$\forall i \in [n]$, Dec($k^{Enc}$,
$\hat{R}_i$)=$R_i \| \sigma_i$ ˆ Verify($k^{MAC}$, $\sigma_i$, $R_i$)=1ˆStmt(R)=b}.

She also proves that $Q$ is well-formed as $Q$=Query($\theta_s$) similarly in a proof $p_q$ and sends ($p_q$, $p_r$, $k^{MAC}$, $\hat{M}$, b) to $\mathcal{V}$.

Given that $\hat{M}$ is an authentic transcript of the TLS session, the prover-integrity property seems to hold. Intuitively, CBC-HMAC ciphertexts bind to the underlying plaintexts, thus $\hat{M}$ can be treated as secure commitments to the session data. That is, a given $\hat{M}$ can only be opened (i.e., decrypted and MAC checked) to a unique message. The binding property prevents $\mathcal{P}$ from opening $\hat{M}$ to a different message other than the original session with the server.

Unfortunately, this intuition is flawed. The strawman protocol fails completely because it cannot ensure the authenticity of $\hat{M}$. The prover $\mathcal{P}$ has the session keys, and thus she can include the encryption of arbitrary messages in $\hat{M}$.

Moreover, the zero-knowledge proofs that $\mathcal{P}$ needs to construct involve decrypting and hashing the entire transcript, which can be prohibitively expensive. For the protocol to be practical, we need to significantly reduce the cost.

Overview of DECO

The critical failing of the above-described strawman approach is that $\mathcal{P}$ learns the session key before she commits to the session. In illustrative embodiments of DECO, the MAC key is withheld from $\mathcal{P}$ until after she commits.

The TLS session between $\mathcal{P}$ and the server $\mathcal{S}$ must still provide confidentiality and integrity. Moreover, the protocol must not degrade performance below the requirements of TLS (e.g., triggering a timeout).

FIG. 4 shows an example DECO implementation comprising a server device, a prover device and a verifier device in an illustrative embodiment. DECO in this embodiment is implemented as a three-phase protocol. The first phase is a novel three-party handshake protocol in which the prover $\mathcal{P}$, the verifier $\mathcal{V}$, and the TLS server $\mathcal{S}$ establish session keys that are secret-shared between $\mathcal{P}$ and $\mathcal{V}$. After the handshake is a query execution phase during which $\mathcal{P}$ accesses the server following the standard TLS protocol, but with help from $\mathcal{V}$. After $\mathcal{P}$ commits to the query and response, $\mathcal{V}$ reveals her key share. Finally, $\mathcal{P}$ proves statements about the response in a proof generation phase.

Three party handshake. Essentially, $\mathcal{P}$ and $\mathcal{V}$ jointly act as a TLS client. They negotiate a shared session key with $\mathcal{S}$ in a secret-shared form. We emphasize that this phase, like the rest of DECO, is completely transparent to $\mathcal{S}$, requiring no server-side modifications.

For the CBC-HMAC cipher suite, at the end of the three-party handshake, $\mathcal{P}$ and $\mathcal{V}$ receive $k_\mathcal{P}^{MAC}$ and $k_\mathcal{V}^{MAC}$ respectively, while $\mathcal{S}$ receives $k^{MAC} = k_\mathcal{P}^{MAC} + k_\mathcal{V}^{MAC}$. As with the standard handshake, both $\mathcal{P}$ and $\mathcal{S}$ get the encryption key $k^{Enc}$.

The three-party handshake can make the aforementioned session-data commitment unforgeable as follows. At the end of the session, $\mathcal{P}$ first commits to the session in $\hat{M}$ as before, then $\mathcal{V}$ reveals her share $k_\mathcal{V}^{MAC}$. From $\mathcal{V}$'s perspective, the three-party handshake protocol ensures that a fresh MAC key (for each direction) is used for every session, despite the influence of a potential malicious prover, and that the keys are unknown to $\mathcal{P}$ until she commits. Without knowledge of the MAC key, $\mathcal{P}$ cannot forge or tamper with session data before committing to it. The unforgeability of the session-data commitment in DECO thus reduces to the unforgeability of the MAC scheme used in TLS.

Other cipher suites such as GCM can be supported similarly. In GCM, a single key (for each direction) is used for both encryption and MAC. The handshake protocol similarly secret-shares the key between $\mathcal{P}$ and $\mathcal{V}$. The handshake protocol for GCM is described in more detail elsewhere herein.

Query execution. Since the session keys are secret-shared, as noted, $\mathcal{P}$ and $\mathcal{V}$ execute an interactive protocol to construct a TLS message encrypting the query. $\mathcal{P}$ then sends the message to $\mathcal{S}$ as a standard TLS client. For CBC-HMAC, they compute the MAC tag of the query, while for GCM they perform authenticated encryption. Note that the query is private to $\mathcal{P}$ and should not be leaked to $\mathcal{V}$. Generic 2PC would be expensive for large queries, so we instead introduce custom 2PC protocols that are orders-of-magnitude more efficient than generic solutions, as described elsewhere herein.

As explained previously, $\mathcal{P}$ commits to the session data $\hat{M}$ before receiving $\mathcal{V}$'s key share, making the commitment unforgeable. Then $\mathcal{P}$ can verify the integrity of the response, and prove statements about it, as will now be described.

Proof generation. With unforgeable commitments, if $\mathcal{P}$ opens the commitment $\hat{M}$ completely (i.e., reveals the encryption key) then $\mathcal{V}$ could easily verify the authenticity of $\hat{M}$ by checking MACs on the decryption.

Revealing the encryption key for $\hat{M}$, however, would breach privacy: it would reveal all session data exchanged between $\mathcal{P}$ and $\mathcal{S}$. In theory, $\mathcal{P}$ could instead prove any statement Stmt over $\hat{M}$ in zero knowledge (i.e., without revealing the encryption key). Generic zero-knowledge proof techniques, though, would be prohibitively expensive for many natural choices of Stmt.

DECO instead introduces two techniques to support efficient proofs for a broad, general class of statement, namely what is referred to herein as "selective opening" of a TLS session transcript. Selective opening involves either revealing a substring to $\mathcal{V}$ or redacting, i.e., excising, a substring, concealing it from $\mathcal{V}$.

FIG. 5 shows as an illustrative example a simplified JSON bank statement for a user Bob acting as a prover. This example will be used to demonstrate selective opening and context-integrity attacks. Suppose Bob ($\mathcal{P}$) wants to reveal his checking account balance to $\mathcal{V}$. Revealing the decryption key for his TLS session would be undesirable: it would also reveal the entire statement, including his transactions. Instead, using techniques disclosed herein, Bob can efficiently reveal only the substring in lines 5-7. Alternatively, if he doesn't mind revealing his savings account balance, he might redact his transactions after line 7.

The two selective opening modes, revealing and redacting substrings, are useful privacy protection mechanisms. They can also serve as pre-processing for a subsequent zero-knowledge proof. For example, Bob might wish to prove that he has an account with a balance larger than $1000, without revealing the actual balance. He would then prove in zero knowledge a predicate ("balance>$1000") over the substring that includes his checking account balance.

Selective opening alone, however, is not enough for many applications. This is because the context of a substring affects its meaning. Without what we call context integrity, $\mathcal{P}$ could cheat and reveal a substring that falsely appears to prove a claim to $\mathcal{V}$. For example, Bob might not have a balance above $1000. After viewing his bank statement, though, he might in the same TLS session post a message to customer service with the substring "balance": $5000 and then view his pending messages (in a form of reflection attack). He could then reveal this substring to fool $\mathcal{V}$.

Various sanitization heuristics on prover-supplied inputs to $\mathcal{V}$, e.g., truncating session transcripts, could potentially prevent some such attacks, but, like other forms of web application input sanitization, are fragile and prone to attack.

Instead, we introduce a rigorous technique by which session data are explicitly but confidentially parsed. We call this technique "zero-knowledge two-stage parsing." In accordance with this technique, $\mathcal{P}$ parses $\hat{M}$ locally in a first stage and then proves to $\mathcal{V}$ a statement in zero knowledge about constraints on a resulting substring. For example, in our banking example, if bank-supplied key-value stores are always escaped with a distinguished character $\lambda$, then Bob could prove a correct balance by extracting via local parsing and revealing to $\mathcal{V}$ a substring "balance": $5000 preceded by $\lambda$. It can be shown that for a very common class of web API grammars (unique keys) this two-phase approach yields much more efficient proofs than more generic techniques.

FIG. 6 shows a more detailed example implementation of the DECO protocol introduced above. In this embodiment, the DECO protocol comprises a three-party handshake phase, followed by 2PC protocols for a query execution phase, and a proof generation phase. Each of these phases will be described in more detail below. It is to be appreciated that the particular details of this embodiment, like other embodiments disclosed herein, are presented by way of example only, and should not be construed as limiting in any way. Those skilled in the art will recognize that additional or alternative techniques may be used.

Three-Party Handshake

The goal of the three-party handshake (3P-HS) in some embodiments is to secret-share between the prover $\mathcal{P}$ and verifier $\mathcal{V}$ the session keys used in a TLS session with server $\mathcal{S}$, in a way that is completely transparent to $\mathcal{S}$. We first focus on CBC-HMAC for exposition, then adapt the protocol to support GCM.

FIG. 7 shows a formal specification of the three-party handshake protocol in an illustrative embodiment.

FIG. 8 shows an example ECtF protocol that is part of the three-party handshake protocol in some embodiments.

Again, the particular details of these protocols are examples only, and not limiting in any way. For example, a wide variety of other types of three-party handshake protocols involving a prover, a verifier and a server can be used in other embodiments. The term "three-party handshake protocol" as used herein is therefore intended to be broadly construed.

As with the standard TLS handshake, 3P-HS includes two steps: first, $\mathcal{P}$ and $\mathcal{V}$ compute additive shares of a secret $Z \in EC(\mathbb{F}_p)$ shared with the server through a TLS-compatible key exchange protocol. ECDHE is recommended and the focus here, although other techniques can be used to compute shares; second, $\mathcal{P}$ and $\mathcal{V}$ derive secret-shared session keys by securely evaluating the TLS-PRF with their shares of Z as inputs, where PRF denotes pseudo random function. Below we give text descriptions so formal specifications are not required for understanding.

Step 1: key exchange. Let $EC(\mathbb{F}_p)$ denote the EC group used in ECDHE and G its generator.

The prover $\mathcal{P}$ initiates the handshake by sending a regular TLS handshake request and a random nonce $r_c$ to $\mathcal{S}$ (in the ClientHello message). On receiving a certificate, the server nonce $r_s$, and a signed ephemeral DH public key $Y_S = s_S \cdot G$ from $\mathcal{S}$ (in the Server-Hello and ServerKeyExchange messages), $\mathcal{P}$ checks the certificate and the signature and forwards them to $\mathcal{V}$. After performing the same check, $\mathcal{V}$ samples a secret $s_V$ and sends her part of the DH public key $Y_V = s_V \cdot G$ to $\mathcal{P}$, who then samples another secret $s_P$ and sends the combined DH public key $Y_P = s_P \cdot G + Y_V$ to $\mathcal{S}$.

Since the server $\mathcal{S}$ runs the standard TLS, $\mathcal{S}$ will compute a DH secret as $Z = s_S \cdot Y_P$ ($\mathcal{P}$ and $\mathcal{V}$) computes its share of Z as $Z_P = s_P \cdot Y_S$ (and $Z_V = s_V \cdot Y_S$). Note that $Z = Z_P + Z_V$ where + is the group operation of $EC(\mathbb{F}_p)$. Assuming the discrete logarithm problem is hard in the chosen group, Z is unknown to either party.

Step 2: key derivation. Now that $\mathcal{P}$ and $\mathcal{V}$ have established additive shares of Z (in the form of EC points), they proceed to derive session keys by evaluating the TLS-PRF keyed with the x coordinate of Z.

A technical challenge here is to harmonize arithmetic operations (i.e., addition in $EC(\mathbb{F}_p)$) with bitwise operations (i.e., TLS-PRF) in 2PC. It is well-known that boolean circuits are not well-suited for arithmetic in large fields. As a concrete estimate, an EC Point addition resulting in just the x coordinate involves 4 subtractions, one modular inversion, and 2 modular multiplications. An estimate of the AND complexity based on highly optimized circuits results in over 900,000 AND gates just for the subtractions, multiplications, and modular reductions—not even including inversion, which would require running the Extended Euclidean algorithm inside a circuit.

Due to the prohibitive cost of adding EC points in a boolean circuit, $\mathcal{P}$ and $\mathcal{V}$ convert the additive shares of an EC point in $EC(\mathbb{F}_p)$ to additive shares of its x-coordinate in $\mathbb{F}_p$, using the ECtF protocol shown in FIG. 8. Then the boolean circuit just involves adding two numbers in $\mathbb{F}_p$, which can be done with only ~3|p| AND gates, that is ~768 AND gates in our implementation where p is 256-bit.

Share conversion using ECtF. The ECtF protocol converts shares in $EC(\mathbb{F}_p)$ to shares in $\mathbb{F}_p$. The inputs to the ECtF protocol are two EC points $P_1, P_2 \in EC(\mathbb{F}_p)$, denoted $P_i = (x_i, y_i)$. Suppose $(x_s, y_s) = P_1 * P_2$ where * is the EC group operation, the output of the protocol is $\alpha, \beta \in \mathbb{F}_p$ such that $\alpha + \beta = x_s$. Specifically, for the curve we consider, $x_s = \lambda^2 - x_1 - x_2$ where $\lambda = (y_2 - y_1)/(x_2 - x_1)$. Shares of the $y_s$ can be computed similarly but we omit that since TLS only uses the $x_s$.

ECtF uses a Multiplicative-to-Additive (MtA) share-conversion protocol as a building block. We use $\alpha, \beta := MtA(a, b)$ to denote a run of MtA between Alice and Bob with inputs a and b respectively. At the end of the run, Alice and Bob receive $\alpha$ and $\beta$ such that $a \cdot b = \alpha + \beta$. The protocol can be generalized to handle vector inputs without increasing the communication complexity. Namely for vectors $a, b \in \mathbb{F}_p^n$, if $\alpha, \beta := MtA(a, b)$, then $\langle a, b \rangle = \alpha + \beta$.

Now we describe the protocol of ECtF. ECtF has two main ingredients. Let [a] denote a 2-out-of-2 sharing of a, i.e., $[a] = (a_1, a_2)$ such that party i has $a_i$ for $i \in \{1, 2\}$ while $a = a_1 + a_2$. The first ingredient is share inversion: given [a], compute $[a^{-1}]$. This can be done as follows: party i samples a random value $r_i$ and executes MtA to compute $\delta_1, \delta_2 := MtA((a_1, r_1), (r_2, a_2))$. Note that $\delta_1 + \delta_2 = a_1 \cdot r_2 + a_2 \cdot r_1$. Party i publishes $v_i = \delta_i + a_i \cdot r_i$ and thus both parties learn $v = v_1 + v_2$. Finally, party i outputs $\beta_i = r_i \cdot v^{-1}$. The protocol computes a correct sharing of $a^{-1}$ because $\beta_1 + \beta_2 = a^{-1}$. Moreover, the protocol doesn't leak a to any party assuming MtA is secure. In fact, party i's view consists of $(a_1 + a_2)(r_1 + r_1)$, which is uniformly random since $r_i$ is uniformly random.

The second ingredient is share multiplication: compute [ab] given [a], [b]. [ab] can be computed using MtA as follows: parties execute MtA to compute $a_1, a_2$ such that $a_1 + a_2 = a_1 \cdot b_2 + a_2 \cdot b_2$. Then, party i outputs $m_i = a_i + a_i \cdot y_i$. The security and correctness of the protocol can be argued similarly as above.

Secure evaluation of the TLS-PRF. Having computed shares of the x-coordinate of Z, the so called premaster secret in TLS, in ECtF, $\mathcal{P}$ and $\mathcal{V}$ evaluate the TLS-PRF in 2PC to derive session keys. Using a known SHA-256 circuit, we hand-optimized the TLS handshake circuit resulting in a circuit with total AND complexity of 779,213.

Adapting to support GCM. For GCM, a single key (for each direction) is used for both encryption and MAC. Adapting the above protocol to support GCM in TLS 1.2 is straightforward. The first step would remain identical, while output of the second step needs to be truncated, as GCM keys are shorter.

Adapting to TLS 1.3. To support TLS 1.3, the 3P-HS protocol must be adapted to a new handshake flow and a different key derivation circuit. Notably, all handshake messages after the ServerHello are now encrypted. A naïve strategy would be to decrypt them in 2PC, which would be costly as certificates are usually large. However, thanks to the key independence property of TLS 1.3, we can construct a 3P-HS protocol of similar complexity to that for TLS 1.2, as described elsewhere herein.

Query Execution

After the handshake, the prover $\mathcal{P}$ sends her query $\mathcal{Q}$ to the server $\mathcal{S}$ as a standard TLS client, but with help from the verifier $\mathcal{V}$. Specifically, since session keys are secret-shared, the two parties need to interact and execute a 2PC protocol to construct TLS records encrypting $\mathcal{Q}$. Although generic 2PC would in theory suffice, it would be expensive for large queries. We instead introduce custom 2PC protocols that are orders-of-magnitude more efficient.

We first focus on one-round sessions where $\mathcal{P}$ sends all queries to $\mathcal{S}$ before receiving any response. Most applications of DECO, e.g., proving provenance of content retrieved via HTTP GET, are one-round. Extending DECO to support multi-round sessions is described elsewhere herein.

CBC-HMAC. Recall that $\mathcal{P}$ and $\mathcal{V}$ hold shares of the MAC key, while $\mathcal{P}$ holds the encryption key. To construct TLS records encrypting $\mathcal{Q}$—potentially private to $\mathcal{P}$, the two parties first run a 2PC protocol to compute the HMAC tag $\tau$ of $\mathcal{Q}$, and then $\mathcal{P}$ encrypts $\mathcal{Q}\|\tau$ locally and sends the ciphertext to $\mathcal{S}$.

Let H denote SHA-256. Recall that the HMAC of message m with key k is $$HMAC_H(k, m) = H(k \oplus opad) \| \underbrace{H((k \oplus ipad)\|m))}_{\text{inner hash}}.$$

The terms ipad and opad denote respective "inner" and "outer" values utilized in the HMAC algorithm. A direct 2PC implementation would be expensive for large queries, as it requires hashing the entire query in 2PC to compute the inner hash. This is advantageously avoided in illustrative embodiments by making the computation of the inner hash local to $\mathcal{P}$ (i.e., without 2PC). If $\mathcal{P}$ knew k⊕ipad, she could compute the inner hash. We cannot, though, simply give k⊕ipad to $\mathcal{P}$, as she could then learn k and forge MACs.

Our optimization exploits the Merkle-Damgård structure in SHA-256. Suppose $m_1$ and $m_2$ are two correctly sized blocks. Then $H(m_1\|m_2)$ is computed as $f_H(f_H(IV, m_1), m_2)$ where $f_H$ denotes the one-way compression function of H, and IV the initial vector.

FIG. 9 shows the post-handshake protocols for CBC-HMAC.

After the three-party handshake, $\mathcal{P}$ and $\mathcal{V}$ execute a simple 2PC protocol to compute $s_0 = f_H(IV, k^{MAC} \oplus ipad)$, and reveal it to $\mathcal{P}$. To compute the inner hash of a message m, $\mathcal{P}$ just uses $s_0$ as the IV to compute a hash of m. Revealing $s_0$ does not reveal $k^{MAC}$, as $f_H$ is assumed to be one-way. To compute HMAC(k, m) then involves computing the outer hash in 2PC on the inner hash, a much shorter message. Thus, we manage to reduce the amount of 2PC computation to a few blocks regardless of query length, as opposed to up to 256 SHA-2 blocks in each record with generic 2PC.

AES-GCM. For GCM, $\mathcal{P}$ and $\mathcal{V}$ perform authenticated encryption of $\mathcal{Q}$. 2PC-AES is straightforward with optimized circuits, but computing tags for large queries is expensive as it involves evaluating long polynomials in a large field for each record. Our optimized protocol makes polynomial evaluation local via precomputation, as described in more detail elsewhere herein. Since 2PC-GCM involves not only tag creation but also AES encryption, it incurs higher computational cost and latency than CBC-HMAC.

Other embodiments disclosed herein utilize a highly efficient alternative protocol, referred to as a proxy mode protocol, that avoids post-handshake 2PC protocols altogether, with additional trust assumptions.

As illustrated in the full DECO protocol shown in FIG. 6, after querying the server and receiving a response, $\mathcal{P}$ commits to the session by sending the ciphertexts to $\mathcal{V}$, and receives $\mathcal{V}$'s MAC key share. Then $\mathcal{P}$ can verify the integrity of the response, and prove statements about it. FIG. 6 specifies the full DECO protocol for CBC-HMAC. The DECO protocol for GCM is similar and described elsewhere herein.

For clarity, we abstract away the details of zero-knowledge proofs in an ideal functionality $\mathcal{F}_{ZK}$. On receiving ("prove", x, w) from $\mathcal{P}$, where x and w are private and public witnesses respectively, $\mathcal{F}_{ZK}$ sends w and the relationship $\pi(x, w) \in \{0,1\}$ (defined below) to $\mathcal{V}$. Specifically, for CBC-HMAC, x, w, $\pi$ are defined as follows: $x=(k^{Enc}, \theta_s, \mathcal{Q}, R)$ and $w=(\hat{\mathcal{Q}}, \hat{R}, k^{MAC}, b)$. The relationship $\pi(x, w)$ outputs 1 if and only if (1) $\hat{\mathcal{Q}}$ (and $\hat{R}$) is the CBC-HMAC ciphertext of $\mathcal{Q}$ (and R) under key $k^{Enc}, k^{MAC}$; (2) Query $(\theta_s) = \mathcal{Q}$; and (3) Stmt(R)=b. Otherwise it outputs 0.

Assuming functionalities for secure 2PC and ZKPs, it can be shown that $Prot_{DECO}$ as illustrated in FIG. 6 UC-securely realizes $\mathcal{F}_{Oracle}$ of FIG. 3 for malicious adversaries.

More particularly, assuming the discrete log problem is hard in the group used in the three-party handshake, and that f (the compression function of SHA-256) is a random oracle, $Prot_{DECO}$ UC-securely realizes $\mathcal{F}_{Oracle}$ in the $(\mathcal{F}_{2PC}, \mathcal{F}_{ZK})$-hybrid world, against a static malicious adversary with abort.

The protocol for GCM has a similar flow. The GCM variants of the three-party handshake and query construction protocols were described above.

FIG. 10 shows the 2PC protocols for verifying tags and decrypting records in the GCM variants. These are also referred to as post-handshake protocols for GCM.

Unlike CBC-HMAC, GCM is not committing: for a given ciphertext $\mathcal{C}$ encrypted with key k, one knowing k can efficiently find k'≠k that decrypts $\mathcal{C}$ to a different plaintext while passing the integrity check. To prevent such attacks, we require $\mathcal{P}$ to commit to her key share $k_\mathcal{P}$ before learning $\mathcal{V}$'s key share. In the proof generation phase, in addition to proving statements about $\mathcal{Q}$ and R, $\mathcal{P}$ needs to prove that the session keys used to decrypt $\hat{\mathcal{Q}}$ and $\hat{R}$ are valid against the commitment to $k_\mathcal{P}$. Proof of the security of the GCM variant is like that for CBC-HMAC.

Proof Generation

Recall that the prover $\mathcal{P}$ commits to the ciphertext $\hat{M}$ of a TLS session and proves to $\mathcal{V}$ that the plaintext M satisfies certain properties. Without loss of generality, we assume $\hat{M}$ and M contain only one TLS record, and henceforth call them the ciphertext record and the plaintext record. Multi-record sessions can be handled by repeating the protocol for each record.

Proving only the provenance of M is easy: just reveal the encryption keys. But this sacrifices privacy. Alternatively, $\mathcal{P}$ could prove any statement about M using general zero-knowledge techniques. But such proofs are often expensive.

In the following description, we present two classes of statements optimized for example applications: revealing only a sub string of the response while proving its provenance ("selective opening"), or further proving that the revealed substring appears in a context expected by $\mathcal{V}$ ("context integrity by two-stage parsing")

Selective Opening. Illustrative embodiments implement what is referred to herein as "selective opening," techniques that allow $\mathcal{P}$ to efficiently reveal or redact substrings in the plaintext. Suppose the plaintext record is composed of chunks $M=(B_1, \ldots, B_n)$ (details of chunking are discussed below). Selective opening allows $\mathcal{P}$ to prove that the ith chunk of M is $B_i$, without revealing the rest of M; we refer to this as Reveal mode. It can also prove that $M_{-i}$ is the same as M but with the chunks removed. We call this Redact mode. Both modes are simple, but useful for practical privacy goals. The granularity of selective opening depends on the cipher suite, which we now discuss.

CBC-HMAC. Recall that for proof generation, $\mathcal{P}$ holds both the encryption and MAC keys $k^{Enc}$ and $k^{MAC}$, while $\mathcal{V}$ only has the MAC key $k^{MAC}$. Our performance analysis assumes a cipher suite with SHA-256 and AES-128, which matches our implementation, but the techniques are applicable to other parameters. Recall that MAC-then-encrypt is used: a plaintext record M contains up to 1024 AES blocks of data and 3 blocks of MAC tag $\sigma$, which we denote as $M=(B_1, \ldots B_{1024}, \sigma)$ where $\sigma=(B_{1025}, B_{1026}, B_{1027})$. $\hat{M}$ is a CBC encryption of M, consisting of the same number of blocks: $\hat{M}=(\hat{B}_1, \ldots, \hat{B}_{1024}, \hat{\sigma})$ where $\hat{\sigma}=(\hat{B}_{1025}, \hat{B}_{1026}, \hat{B}_{1027})$ Revealing a TLS record. A naïve way to prove that $\hat{M}$ encrypts M without revealing $k^{Enc}$ is to prove correct encryption of each AES block in ZKP. However, this would require up to 1027 invocations of AES in ZKP, resulting in impractical performance.

Leveraging the MAC-then-encrypt structure, the same can be done using only 3 invocations of AES in ZKP. This illustratively involves proving that the last few blocks of $\hat{M}$ encrypt a tag a and revealing the plaintext directly. Specifically, $\mathcal{P}$ computes $$\pi = \text{ZK-PoK}\{k^{Enc}: \hat{\sigma} = \text{CBC}(k^{Enc}, \sigma)\}$$

and sends (M, $\pi$) to $\mathcal{V}$. Then $\mathcal{V}$ verifies $\pi$ and checks the MAC tag over M (note that $\mathcal{V}$ knows the MAC key.) Its security relies on the collision-resistance of the underlying hash function in HMAC, i.e., $\mathcal{P}$ cannot find M'≠M with the same tag $\sigma$.

Revealing a record with redacted blocks. Suppose the ith block contains sensitive information that $\mathcal{P}$ wants to redact. A direct strategy is to prove that $B_{i-}=(B_1, \ldots, B_{i-1})$ and $B_{i+}=(B_{i+1}, \ldots, B_n)$ form the prefix and suffix of the plaintext encrypted by $\hat{M}$, by computing $$\text{ZK-PoK}\{k^{Enc}, B_i: \hat{\sigma} = \text{CBC}(k^{Enc}, \sigma)^\wedge \sigma = \text{HMAC}(k^{MAC}, B_{i-}\|B_i\|B_{i+})\}.$$

This is expensive though as it would involve 3 AES and 256 SHA-256 compression in ZKP.

Leveraging the Merkle-Damgård structure of SHA-256, several optimizations are possible. Let f denote the compression function of SHA-256, and $s_{i-1}$ the state after applying f on $B_{i-}$. First, if both $s_{i-1}$ and $s_i$ can be revealed, e.g., when $B_i$ contains high-entropy data such as API keys, the above goal can be achieved using just 1 SHA-256 in ZKP. To do so, $\mathcal{P}$ computes $\pi = \text{ZK-PoK}\{B_i: f(s_{i-1}, B_i) = s_i\}$ and sends ($\pi \cdot s_{i-1}, s_i, B_{i-}, B_{i+}$) to $\mathcal{V}$, who then 1) checks $s_{i-1}$ by recomputing it from $B_{i-}$; 2) verifies $\pi$; and 3) checks the MAC tag a by recomputing it from $s_i$ and $B_{i+}$. Assuming $B_i$ is high entropy, revealing $s_{i-1}$ and $s_i$ doesn't leak $B_i$ since f is one-way.

On the other hand, if both $s_{i-1}$ and $s_i$ cannot be revealed to $\mathcal{V}$ (e.g., when brute-force attacks against $B_i$ is feasible), we can still reduce the cost by having $\mathcal{P}$ redact a prefix (or suffix) of the record containing the block $B_i$. The cost incurred then is 256-i SHA-2 hashes in ZKP. Additional details are provided elsewhere herein. Generally ZKP cost is proportional to record sizes so TLS fragmentation can also lower the cost by a constant factor.

Redacting a suffix. When a suffix $B_{i+}$ is to be redacted, $\mathcal{P}$ computes $\pi = \text{ZK-PoK}\{B_{i+}, k^{Enc}: f(s_i, B_{i+}) = ih^\wedge H(k^{MA_-} c \oplus \text{opad}\|ih) = \sigma^\wedge B_{1025}\|B_{1026}\|B_{1027} = \text{CBC}(k^{Enc}, \sigma)\}$ and $s_i$ is the state after applying f on $B_{i-}\|B_i \cdot \mathcal{P}$ send ($\pi, B_{i-}\|B_j$) to $\mathcal{V}$. The verifier then 1) checks $s_{i-1}$ by applying f on $B_{i-}\|B_i$, and 2) verifies $\pi$. Essentially, the security of this follows from pre-image resistance of f. Moreover, $\mathcal{V}$ doesn't learn the redacted suffix since ih=f(s, $B_{i+}$) is kept secret from $\mathcal{V}$. The total cost is 3 AES and 256-i SHA-2 hashes in ZKP.

Redacting a prefix. $\mathcal{P}$ computes two ZKPs: 1) $\pi_1 = \text{ZK-PoK}\{B_{i-}, k^{MAC}: H(k^{MAC} \oplus \text{ipad}\|B_{i-}) = s_{i-1}\}$: 2) $\pi_2 = \text{ZK-PoK}\{k^{MAC}, k^{Enc}: H(k^{MAC} \oplus \text{opad}\|ih) = \sigma^\wedge B_{1025}\|B_{1026}\|B_{1027} = \text{CBC}(k^{Enc}, \sigma)\}$. $\mathcal{P}$ sends ($\pi_1, \pi_2, s_{i-1}, B_i\|B_{i+}$) to $\mathcal{V}$. The verifier checks that 1) $s_{i-1}$ is correct using $\pi_1$ and then computes $f(s_{i-1}, B_i\|B_{i+})$ to obtain the inner hash ih, 2) $\pi_2$ is verified using the computed ih. The cost incurred is 3 AES and 256-i SHA-2 hashes in ZKP.

Note that redacting a prefix/suffix only makes sense if the revealed portion does not contain any private user data. Otherwise, $\mathcal{P}$ would have to find the smallest substring containing all the sensitive blocks and redact either the prefix/suffix similar to above.

GCM. Unlike CBC-HMAC, revealing a block is very efficient in GCM. First, $\mathcal{P}$ reveals AES(k, IV) and AES(k, 0), with proofs of correctness in ZK, to allow $\mathcal{V}$ to verify the integrity of the ciphertext. Then, to reveal the ith block, $\mathcal{P}$ just reveals the encryption of the ith counter $C_i = \text{AES}(k, \text{inc}^i(IV))$ with a correctness proof. $\mathcal{V}$ can decrypt the ith block as $\hat{B}_i \oplus C_i$. IV is the public initial vector for the session, and $\text{inc}^i(IV)$ denotes incrementing IV for i times (the exact format of inc is immaterial.) To reveal a TLS record, $\mathcal{P}$ repeat the above protocol for each block. Again, additional details are provided elsewhere herein.

In summary, CBC-HMAC allows efficient selective revealing at the TLS record-level and redaction at block level in DECO, while GCM allows efficient revealing at block level. Selective opening can also serve as pre-processing to reduce the input length for a subsequent zero-knowledge proof.

Context Integrity by Two-Stage Parsing. For many applications, the verifier $\mathcal{V}$ may need to verify that the revealed substring appears in the right context. We refer to this property as "context integrity." In the following we present techniques for $\mathcal{V}$ to specify contexts and for $\mathcal{P}$ to prove context integrity efficiently.

For ease of exposition, our description below initially focuses on the revealing mode, i.e., $\mathcal{P}$ reveals a substring of the server's response to $\mathcal{V}$. The redaction mode will then be described.

Specification of contexts. Our techniques for specifying contexts assume that the TLS-protected data sent to and from a given server $\mathcal{S}$ has a well-defined context-free grammar $\mathcal{G}$, known to both $\mathcal{P}$ and $\mathcal{V}$. In a slight abuse of notation, we let $\mathcal{G}$ denote both a grammar and the language it specifies. Thus, R∈$\mathcal{G}$ denotes a string R in the language given by $\mathcal{G}$. We assume that $\mathcal{G}$ is unambiguous, i.e., every R∈$\mathcal{G}$ has a unique associated parse-tree $T_R$. JSON and HTML are examples of two widely used languages that satisfy these requirements, and are our focus here.

When $\mathcal{P}$ then presents a substring $R_{open}$ of some response R from $\mathcal{S}$, we say that $R_{open}$ has context integrity if $R_{open}$ is produced in a certain way expected by $\mathcal{V}$. Specifically, $\mathcal{V}$ specifies a set S of positions in which she might expect to see a valid substring $R_{open}$ in R. In our definition, S is a set of paths from the root in a parse-tree defined by $\mathcal{G}$ to internal nodes. Thus s∈S, which we call a permissible path, is a sequence of non-terminals. Let $\rho_R$ denote the root of $T_R$ (the parse-tree of R in $\mathcal{G}$). We say that a string $R_{open}$ has context-integrity with respect to (R, S) if $T_R$ has a subtree whose leaves yield (i.e. concatenate to form) the string $R_{open}$, and that there is a path s∈S from $\rho_R$ to the root of the said subtree.

Formally, we define context integrity in terms of a predicate $CTX_G$. More particularly, given a grammar $G$ on TLS responses, R∈$G$, a substring $R_{open}$ of R, a set S of permissible paths, we define a context function $CTX_G$ as a boolean function such that $CTX_G$ : (S, R, $R_{open}$) ↦ true if and only if there exists a sub-tree $T_{R_{open}}$ of $T_R$ with a path s∈S from $\rho_{T_R}$ to $$\rho_{T_{R_{open}}}$$

and $T_{R_{open}}$ yields $R_{open}$·$R_{open}$ is said to have context integrity with respect to (R, S) if $CTX_G$ (S, R, $R_{open}$)=true.

Referring again to the example of FIG. 5, consider a JSON string J in accordance with that example. JSON contains (roughly) the following rules:

| Start → object | object → { pairs } |
|---|---|
| pair → "key": value | pairs → pair ǀ pair, pairs |
| key → chars | value → chars ǀ object |

In that example, $\mathcal{V}$ was interested in learning the derivation of the pair $\rho_{balance}$ with key "balance" in the object given by the value of the pair $\rho_{checking}$ with key "checking a/c". Each of these non-terminals is the label for a node in the parse-tree $T_J$. The path from the root Start of $T_J$ to $\rho_{checking}$ requires traversing a sequence of nodes of the form Start→object→pairs*→$\rho_{checking}$, where pairs* denotes a sequence of zero or more pairs. So S is the set of such sequences and $R_{open}$ is the string "checking a/c": {"balance": $2000}.

Two-stage parsing. Generally, proving $R_{open}$ has context integrity, i.e., $CTX_G$ (S, R, $R_{open}$)=true, without directly revealing R would be expensive, since computing $CTX_G$ may require computing $T_R$ for a potentially long string R. However, we observed that under certain assumptions that TLS-protected data generally satisfies, much of the overhead can be removed by having $\mathcal{P}$ preprocess R by applying a transformation Trans agreed upon by $\mathcal{P}$ and $\mathcal{V}$, and prove that $R_{open}$ has context integrity with respect to R' (a usually much shorter string) and S' (a set of permissible paths specified by $\mathcal{V}$ based on S and Trans).

Based on this observation, we introduce a two-stage parsing scheme for efficiently computing $R_{open}$ and proving $CTX_G$ (S, R, $R_{open}$)=true. Suppose $\mathcal{P}$ and $\mathcal{V}$ agree upon $G$, the grammar used by the web server, and a transformation Trans. Let $G'$ be the grammar of strings Trans(R) for all R∈$G$. Based on Trans, $\mathcal{V}$ specifies permissible paths S' and a constraint-checking function $cons_{G,G'}$. In the first stage, $\mathcal{P}$ : (1) computes a substring $R_{open}$ of R by parsing R (such that $CTX_G$ (S, R, $R_{open}$)=true) (2) computes another string R'=Trans(R). In the second stage, $\mathcal{P}$ proves to $\mathcal{V}$ in zero-knowledge that (1) $cons_{G,G'}$ (R, R')=true and (2) $CTX_{G'}$ (S', R', $R_{open}$)=true. Note that in addition to public parameters $G$, $G'$, S, S', Trans, $cons_{G,G'}$, the verifier only sees a commitment to R, and finally, $R_{open}$.

This protocol makes the zero-knowledge computation significantly less expensive by deferring actual parsing to a non-verifiable computation. In other words, the computation of $CTX_{G'}$ (S', R', $R_{open}$) and $cons_{G,G'}$ (R, R') can be much more efficient than that of $CTX_G$ (S, R, $R_{open}$).

We formalize the correctness condition for the two-stage parsing in an operational semantics rule given below. Here, ⟨f, σ⟩ denotes applying a function f on input σ, while $$\frac{P}{C}$$

denotes that if the premise P is true, then the conclusion C is true.

Given a grammar $G$, a context function and permissible paths $CTX_G$ (S, ., .), a transformation Trans, a grammar $G'$={R': R'=Trans(R), R∈$G$} with context function and permissible paths $CTX_{G'}$ (S', ., .) and a function $cons_{G,G'}$, we say ($cons_{G,G'}$, S') are correct with respect to S, if for all (R, R', $R_{open}$) such that R∈$G$, booleans b the following rule holds:

$$\frac{\langle cons_{G,G'}, (R, R')\rangle \Rightarrow \text{true} \ \langle CTX_{G'}, (S', R', R_{open})\rangle \Rightarrow b}{\langle CTX_G, (S, R, R_{open})\rangle \Rightarrow b}$$

Below, we focus on an example grammar suitable for use in DECO applications, and present concrete constructions of two-stage parsing schemes.

Key-value grammars. A broad class of data formats, such as JSON, have a notion of key-value pairs. Thus, they are our focus in some embodiments of DECO.

A key-value grammar $G$ produces key-value pairs according to the rule, "pair→start key middle value end", where start, middle and end are delimiters. For such grammars, an array of optimizations can greatly reduce the complexity for proving context. We discuss a few such optimizations below, with other details provided elsewhere herein.

Revelation for a globally unique key. For a key-value grammar $G$, set of paths S, if for an R∈$G$, a substring $R_{open}$ satisfying context-integrity requires that $R_{open}$ is parsed as a key-value pair with a globally unique key K, $R_{open}$ simply needs to be a substring of R and correctly be parsed as a pair. Specifically, Trans(R) outputs a substring R' of R containing the desired key, i.e., a substring of the form "start K middle value end" and $\mathcal{P}$ can output $R_{open}$=R'. $G'$ can be defined by the rule $S_{G'}$ →pair where $S_{G'}$ is the start symbol in the production rules for $G'$. Then (1) $cons_{G,G'}$ (R, R') checks that R' is a substring of R and (2) for S'={ $S_{G'}$ }, $CTX_{G'}$ (S',R', $R_{open}$) checks that (a) R'∈$G'$ and (b) $R_{open}$=R'. Globally unique keys arise in some applications herein, such as when selectively opening the response for age.

Redaction in key-value grammars. Thus far, our description of two-stage parsing assumes the Reveal mode in which $\mathcal{P}$ reveals a substring $R_{open}$ of R to $\mathcal{V}$ and proves that $R_{open}$ has context integrity with respect to the set of permissible paths specified by $\mathcal{V}$. In the Redact mode, the process is similar, but instead of revealing $R_{open}$ in the clear, $\mathcal{P}$ generates a commitment to $R_{open}$ using techniques described previously and reveals R, with $R_{open}$ removed, for example, by replacing its position with a dummy character.

Applications

DECO as disclosed herein can be used for any oracle-based application. To illustrate its versatility, we have implemented and evaluated three example applications that leverage its various capabilities: 1) a confidential financial instrument realized by smart contracts; 2) converting legacy credentials to anonymous credentials; and 3) privacy-preserving price discrimination reporting.

Confidential Financial Instruments. Financial derivatives are among the most commonly cited smart contract applications, and exemplify the need for authenticated data feeds (e.g., stock prices). For example, one popular financial instrument that is easy to implement in a smart contract is a binary option. This is a contract between two parties betting on whether, at a designated future time, e.g., the close of day D, the price P* of some asset N will equal or exceed a predetermined target price P, i.e., P*≥P. A smart contract implementing this binary option can call an oracle $\mathcal{O}$ to determine the outcome.

In principle, $\mathcal{O}$ can conceal the underlying asset N and target price P for a binary option on chain. It simply accepts the option details off chain, and reports only a bit specifying the outcome Stmt:=P*≥? P. This approach is referred to as a Mixicle.

A limitation of a basic Mixicle construction is that $\mathcal{O}$ itself learns the details of the financial instrument. Prior to DECO, only oracle services that use trusted execution environments (TEEs) could conceal queries from $\mathcal{O}$. We now show how DECO can support execution of the binary option without $\mathcal{O}$ learning the details of the financial instrument, i.e., N or P. It should be noted in this regard that the predicate direction ≥? or ≤? can be randomized. Also, winner and loser identities and payment amounts can be concealed. Additional steps can be taken to conceal other metadata, e.g., the exact settlement time.

In this example application, the option winner plays the role of $\mathcal{P}$, and obtains a signed result of Stmt from $\mathcal{O}$, which plays the role of $\mathcal{V}$. We now describe the protocol and its implementation.

Let $\{sk_\mathcal{O}, pk_\mathcal{O}\}$ denote the oracle's key pair. In this embodiment, a binary option is specified by an asset name N, threshold price P, and settlement date D. We denote the commitment of a message M by $C_M$=com(M, $r_M$) with a witness $r_M$.

FIG. 11 illustrates two parties Alice and Bob executing a confidential binary option. Alice uses DECO to access a stock price API and convince $\mathcal{O}$ she has won. Examples of request and response are shown to the right, and shaded text in this portion of the figure is sensitive information to be redacted.

The binary option process illustrated in FIG. 11 includes the following steps:

1) Setup: Alice and Bob agree on the binary option {N, P, D} and create a smart contract SC with identifier $ID_{SC}$. The contract contains $pk_\mathcal{O}$, addresses of the parties, and commitments to the option $\{C_N, C_P, C_D\}$ with witnesses known to both parties. They also agree on public parameters $\theta_P$ (e.g., the URL to retrieve asset prices).

2) Settlement: Suppose Alice wins the bet. To claim the payout, she uses DECO to generate a ZKP that the current asset price retrieved matches her position. Alice and $\mathcal{O}$ execute the DECO protocol (with $\mathcal{O}$ acting as the verifier) to retrieve the asset price from $\theta_P$ (the target URL). We assume the response contains (N*, P*, D*). In addition to the ZKP in DECO to prove origin $\theta_P$, Alice proves the following statement:

$$ZK\text{-}PoK\{P, N^*, P^*, D^*, r_N, r_P r_D : (P \leq P^*)^\wedge$$

$$C_N\text{=}com(N^*, r_N)^\wedge C_P\text{=}com(P, r_P)^\wedge C_D\text{=}com(D^*, r_D)\}.$$

Upon successful proof verification, the oracle returns a signed statement with the contract ID, S=Sig($sk_\mathcal{O}$, $ID_{SC}$).

3) Payout: Alice provides the signed statement S to the contract, which verifies the signature and pays the winning party.

Alice and Bob need to trust $\mathcal{O}$ for integrity, but not for privacy. They can further hedge against integrity failure by using multiple oracles, as explained elsewhere herein. Decentralizing trust over oracles is a standard and already deployed technique. We emphasize that DECO ensures privacy even if all the oracles are malicious.

As indicated above, FIG. 11 shows the request and response of a stock price API. The user ($\mathcal{P}$) also needs to reveal enough portion of the HTTP GET request to oracle ($\mathcal{V}$) in order to convince access to the correct API endpoint. The GET request contains several parameters—some to be revealed like the API endpoint, and others with sensitive details like stock name and private API key. $\mathcal{P}$ redacts sensitive params using techniques disclosed herein and reveals the rest to $\mathcal{V}$. The API key provides enough entropy preventing $\mathcal{V}$ from learning the sensitive params. Without additional care though, a cheating $\mathcal{P}$ can alter the semantics of the GET request and conceal the cheating by redacting extra parameters. To ensure this does not happen, $\mathcal{P}$ needs to prove that the delimiter "&" and separator "=" do not appear in the redacted text.

Let $\hat{R}$ and R denote the response ciphertext and the plaintext respectively. To settle an option, $\mathcal{P}$ proves to $\mathcal{V}$ that R contains evidence that he won the option, using the two-stage parsing scheme described previously. In the first stage, $\mathcal{P}$ parses R locally and identifies the smallest substring of R that can convince $\mathcal{V}$. In the FIG. 11 embodiment, involving stock prices, $R_{price}$="05.price": "1157.7500" suffices. In the second stage, $\mathcal{P}$ proves knowledge of ($R_{price}$, P, $r_P$) in ZK such that 1) $R_{price}$ is a substring of the decryption of $\hat{R}$; 2) $R_{price}$ starts with "05.price"; 3) the subsequent characters form a floating point number P* and that P*≥P; and 4) com(P, $r_P$)=$C_P$.

This two-stage parsing is secure assuming the keys are unique and the key "05.price" is followed by the price, making the grammar of this response a key-value grammar with unique keys, as described above. Similarly, $\mathcal{P}$ proves that the stock name and date contained in R match the commitments. With the CBC-HMAC cipher suite, the zero-knowledge proof circuit involves redacting an entire record (408 bytes), computing commitments, and string processing.

HTTP GET requests (and HTML) have a special restriction: the demarcation between a key and a value (i.e., middle) and the start of a key-value pair (i.e., start) are never substrings of a key or a value. This means that to redact more than a single contiguous key or value, $\mathcal{P}$ must redact characters in {middle, start}. So we have $cons_{\mathcal{G},\mathcal{G}'}$(R, R') check that: (1) |R|=|R'|; and (2) $\forall_i \in |R'|$, either R'[i]= D^R[i]∉{middle, start} or R[i]=[i] (D is a dummy character used to do in-place redaction). Checking $ctx_\mathcal{G'}$, is then unnecessary.

Legacy Credentials to Anonymous Credentials: Age Proof. User credentials are often inaccessible outside a service provider's environment. Some providers offer third-party API access via OAuth tokens, but such tokens reveal user identifiers. DECO allows users holding credentials in existing systems (what we call "legacy credentials") to prove statements about them to third parties (verifiers) anonymously. Thus, DECO in some embodiments allows users to convert any web-based legacy credential into an anonymous credential without server-side support or trusted hardware.

FIG. 12 shows an example of this application, in which a student proves her/his age is over 18 using credentials (demographic details) stored on a University website. A student can provide this proof of age to any third party, such as a state issuing a driver's license or a hospital seeking consent for a medical test. We implement this example using the AES-GCM cipher suite and two-stage parsing with optimizations based on unique keys.

In the FIG. 12 example, the demographic details of a student stored on a University website include the name, birth date, student ID among others. Highlighted text contains student age. Reveal mode is used together with two-stage parsing. The prover parses 6-7 AES blocks that contain the birth date and proves her age is above 18 in ZK to the verifier. Like other examples, due to the unique HTML tags surrounding the birth date, this is also a key-value grammar with unique keys. Similar to the binary option application, this example requires additional string processing to parse the date and compute age.

Price Discrimination. Price discrimination refers to selling the same product or service at different prices to different buyers. Ubiquitous consumer tracking enables online shopping and booking websites to employ sophisticated price discrimination, e.g., adjusting prices based on customer zip codes. Price discrimination can lead to economic efficiency, and is thus widely permissible under existing laws.

In the U.S., however, the FTC forbids price discrimination if it results in competitive injury, while new privacy-focused laws in Europe, such as the GDPR, are bringing renewed focus to the legality of the practice. Consumers in any case generally dislike being subjected to price discrimination. Currently, however, there is no trustworthy way for users to report online price discrimination.

FIG. 13 shows an example of this application, in which DECO allows a buyer to make a verifiable claim about perceived price discrimination by proving the advertised price of a good is higher than a threshold, while hiding sensitive information such as name and address. We implement this example using the AES-GCM cipher suite for the TLS session and reveal 24 AES blocks containing necessary order details and the request URL.

As illustrated in FIG. 13, parts of an order invoice page in HTML on a shopping website (e.g., Amazon) include personal details such as the name and address of the buyer. The buyer wants to convince a third-party (verifier) about the charged price of a particular product on a particular date. In this example, we use AES-GCM ciphersuite and Reveal mode to reveal the necessary text in the upper portion of the order invoice page, while the shaded sensitive text in the lower portion, including the shaded buyer name, address and city, is hidden. The number of AES blocks revealed from the response is 20 (due to a long product name). In addition, 4 AES blocks from the request are revealed to prove that the correct endpoint is accessed. Context integrity is guaranteed by revealing unique strings around, e.g., the string "<tr> Order Total:" near the item price appears only once in the entire response.

Implementation and Evaluation

We now describe implementation details and evaluation results for DECO and the three applications.

Three-Party Handshake and Query Execution. We implemented the three-party handshake protocol (3P-HS) for TLS 1.2 and query execution protocols (2PC-HMAC and 2PC-GCM) in about 4700 lines of C++ code. We built a hand-optimized TLS-PRF circuit with total AND complexity of 779,213. We also used variants of a known AES circuit. Our implementation uses Relic for the Paillier cryptosystem and the EMP toolkit for the maliciously secure 2PC protocol.

We integrated the three-party handshake and 2PC-HMAC protocols with mbedTLS, a popular TLS implementation, to build an end-to-end system. 2PC-GCM can be integrated to TLS similarly with more engineering effort. We evaluated the performance of 2PC-GCM separately. The performance impact of integration should be negligible. We did not implement 3P-HS for TLS 1.3, but it is believed that the performance should be comparable to that for TLS 1.2, since the circuit complexity is similar.

We evaluated the performance of DECO in both the LAN and WAN settings. Both the prover and verifier run on a c5.2xlarge Amazon Web Services (AWS) node with 8 virtual Central Processing Unit (vCPU) cores and 16 gigabytes (GB) of random access memory (RAM). We located the two nodes in the same region (but different availability zones) for the LAN setting, but in two distinct data centers (in Ohio and Oregon) in the WAN setting. The round-trip time between two nodes in the LAN and WAN is about 1 ms and 67 ms, respectively, and the bandwidth is about 1 Gbps.

TABLE 1 below summarizes the runtime of DECO protocols during a TLS session. 50 samples were used to compute the mean and standard error of the mean (in parenthesis). The MPC protocol we used relies on offline preprocessing to improve performance. Since the offline phase is input- and target-independent, it can be done prior to the TLS session. Only the online phase is on the critical path.

TABLE 1

Run time of 3P-HS and query execution protocols. All times are in milliseconds.

| | | LAN | | WAN | |
|---|---|---|---|---|---|
| | | Online | Offline | Online | Offline |
| 3P-Handshake | TLS 1.2 only | 368.5 (0.6) | 1668 (4) | 2850 (20) | 10290 (10) |
| 2PC-HMAC | TLS 1.2 only | 133.8 (0.5) | 164.9 (0.4) | 2520 (20) | 3191 (8) |
| 2PC-GCM (256 B) | 1.2 and 1.3 | 36.65 (0.02) | 392 (8) | 1208.5 (0.2) | 12010 (70) |
| 2PC-GCM (512 B) | 1.2 and 1.3 | 53.0 (0.5) | 610 (10) | 2345 (1) | 12520 (70) |
| 2PC-GCM (1 KB) | 1.2 and 1.3 | 101.9 (0.5) | 830 (20) | 4567 (4) | 14300 (200) |
| 2PC-GCM (2 KB) | 1.2 and 1.3 | 204.7 (0.9) | 1480 (30) | 9093.5 (0.9) | 18500 (200) |

As shown in TABLE 1, DECO protocols are very efficient in the LAN setting. It takes 0.37 seconds to finish the three-party handshake. For query execution, 2PC-HMAC is efficient (0.13 s per record) as it only involves one SHA-2 evaluation in 2PC, regardless of record size. 2PC-GCM is generally more expensive and the cost depends on the query length, as it involves 2PC-AES over the entire query. We evaluated its performance with queries ranging from 256 B to 2 KB, the typical sizes seen in HTTP GET requests. In the LAN setting, the performance is efficient and comparable to 2PC-HMAC.

In the WAN setting, the runtime is dominated by the network latency because MPC involves many rounds of communication. Nonetheless, the performance is still acceptable, given that DECO is likely to see only periodic use for most applications we consider.

Proof Generation. We instantiated zero-knowledge proofs with a standard proof system in libsnark. We have devised efficiently provable statement templates, but users of DECO need to adapt them to their specific applications. Succinct non-interactive argument of knowledge (SNARK) compilers enable such adaptation in a high-level language, concealing low-level details from developers. We used xjsnark and its Java-like high-level language to build statement templates and libsnark compatible circuits.

Our rationale in choosing libsnark is its relatively mature tooling support. The proofs generated by libsnark are constant-size and very efficient to verify, the downside being the per-circuit trusted setup. With more effort, DECO can be adapted to use, e.g., Bulletproofs, which requires no trusted setup but has large proofs and verification time.

We measure five performance metrics for each example—prover time (the time to generate the proofs), verifier time (the time to verify proofs), proof size, number of arithmetic constraints in the circuit, and the peak memory usage during proof generation.

TABLE 2 below summarizes the results. 50 samples were used to compute the mean and its standard error. Through the use of efficient statement templates and two-stage parsing, DECO achieves very practical prover performance. Since libsnark optimizes for low verification overhead, the verifier time is negligible. The number of constraints (and prover time) is highest for the binary option application due to the extra string parsing routines. We use multiple proofs in each application to reduce peak memory usage. For the most complex application, the memory usage is 1.78 gigabytes (GB). As libsnark proofs are of a constant size 287 bytes (B), the proof sizes shown are multiples of that.

TABLE 2

Costs of generating and verifying ZKPs in proof-generation phase of DECO for applications.

|  | Binary Option | Age Proof | Price Discrimination |
|---|---|---|---|
| prover time | 12.97 ± 0.04 s | 3.67 ± 0.02 s | 12.68 ± 0.02 s |
| verifier time | 0.01 s | 0.01 s | 0.05 s |
| proof size | 861 B | 574 B | 1722 B |
| # constraints | 617 k | 164 k | 535 k |
| Memory | 1.78 GB | 0.69 GB | 0.92 GB |

End-to-End Performance. DECO end-to-end performance depends on the available TLS cipher suites, the size of private data, and the complexity of application-specific proofs. Here we present the end-to-end performance of the most complex application of the three we implemented—the binary option. It takes about 13.77 s to finish the protocol, which includes the time taken to generate unforgeable commitments (0.50 s), to run the first stage of two-stage parsing (0.30 s), and to generate zero-knowledge proofs (12.97 s). These numbers are computed in the LAN setting; in the WAN setting, MPC protocols are more time-consuming (5.37 s), pushing the end-to-end time up to 18.64 s.

In comparison, Town Crier uses TEEs to execute a similar application in about 0.6 s, i.e., around 20× faster than DECO, but with added trust assumptions. Since DECO is likely to be used only periodically for most applications, its overhead in achieving cryptographic-strength security assurances seems reasonable.

Legal and Compliance Issues

Although users can already retrieve their data from websites, DECO allows users to export the data with integrity proofs without their explicit approval or even awareness. We now briefly discuss the resulting legal and compliance considerations.

Critically, however, DECO users cannot unilaterally export data to a third party with integrity assurance, but rely on oracles as verifiers for this purpose. While DECO keeps user data private, oracles learn what websites and types of data a user accesses. Thus oracles can enforce appropriate data use, e.g., denying transactions that may result in copyright infringement.

Both users and oracles bear legal responsibility for the data they access. Recent case law on the Computer Fraud and Abuse Act (CFAA), however, shows a shift away from criminalization of web scraping, and federal courts have ruled that violating websites' terms of service is not a criminal act per se. Users and oracles that violate website terms of service, e.g., "click wrap" terms, instead risk civil penalties. DECO compliance with a given site's terms of service is a site- and application-specific question.

Oracles have an incentive to establish themselves as trustworthy within smart-contract and other ecosystems. We expect that reputable oracles will provide users with menus of the particular attestations they issue and the target websites they permit, vetting these options to maximize security and minimize liability and perhaps informing or cooperating with target servers.

The legal, performance, and compliance implications of incorrect attestations based on incorrect (and potentially subverted) data are also important. Internet services today have complex, multi-site data dependencies, though, so these issues aren't specific to DECO. Oracle services already rely on multiple data sources to help ensure correctness. Oracle services in general could ultimately spawn infrastructure like that for certificates, including online checking and revocation capabilities and different tiers of security.

DECO in illustrative embodiments disclosed herein is a privacy-preserving, decentralized oracle scheme for modern TLS versions that requires no trusted hardware or server-side modifications. DECO allows a prover to generate unforgeable commitments to TLS sessions and efficiently prove statements about session content. Some embodiments mitigate context-integrity attacks that are universal to privacy-preserving oracles, utilizing a novel two-stage parsing scheme. DECO can liberate data from centralized web-service silos, making it accessible to a rich spectrum of applications. The practicality of DECO is demonstrated herein through a fully functional implementation along with three example applications.

Protocol Details for GCM

GCM is an authenticated encryption with additional data (AEAD) cipher. To encrypt, the GCM cipher takes as inputs a tuple (k, IV, M, A): a secret key, an initial vector, a plaintext of multiple AES blocks, and additional data to be included in the integrity protection; it outputs a ciphertext C and a tag T. Decryption reverses the process. The decryption cipher takes as input (k, IV, C, A, T) and first checks the integrity of the ciphertext by comparing a recomputed tag with T, then outputs the plaintext.

The ciphertext is computed in the counter mode: $C_i = AES(k, inc^i(IV)) \oplus M_i$, where $inc^i$ denotes incrementing IV for i times (the exact format of inc is immaterial.)

The tag Tag(k, IV, C, A) is computed as follows. Given a vector $X \in \mathbb{F}_{2^{128}}^m$, the associated GHASH polynomial $P_X$: $\mathbb{F}_{2^{128}} \to \mathbb{F}_{2^{128}}$ is defined as $P_X(h) = \Sigma_{i=1}^{m} X_i \cdot h^{m-i+1}$ with addition and multiplication done in $\mathbb{F}_{2^{128}}$. Without loss of generality, suppose A and C are properly padded. Let $\ell_A$ and $\ell_C$ denote their length. A GCM tag is $$\text{Tag}(k, IV, C, A) := \text{AES}(k, IV) \oplus P_{A\|C\|\ell_A\|\ell_C}(h) \quad (1)$$

where h=AES(k, 0).

When GCM is used in TLS, each plaintext record D is encrypted as follows. A unique nonce n is chosen and the additional data $\kappa$ is computed as a concatenation of the sequence number, version, and length of D. GCM encryption is invoked to generate the payload record as M=n‖GCM(k, n, D, $\kappa$).

Additional details regarding GCM can be found in, for example, Morris J Dworkin, SP 800-38d, "Recommendation for block cipher modes of operation: Galois/counter mode (GCM) and GMAC," Technical Report, 2007, which is incorporated by reference herein.

Query Execution

Tag creation/verification. Computing or verifying a GCM tag involves evaluating Equation (1) above in 2PC. A challenge is that Equation (1) involves both arithmetic computation (e.g., polynomial evaluation in $\mathbb{F}_{2^{128}}$) as well as binary computation (e.g., AES). Performing multiplication in a large field in a binary circuit is expensive, while computing AES (defined in $GF(2^8)$) in $\mathbb{F}_{2^{128}}$ incurs high overhead. Even if the computation could somehow separated into two circuits, evaluating the polynomial alone—which takes approximately 1,000 multiplications in $\mathbb{F}_{2^{128}}$ for each record—would be unduly expensive.

Our protocol removes the need for polynomial evaluation. The actual 2PC protocol involves only binary operations and thus can be done in a single circuit. Moreover, the per-record computation is reduced to only one invocation of 2PC-AES.

This is achieved by computing shares of $\{h^i\}$ (in a 2PC protocol) in a preprocessing phase at the beginning of a session. The overhead of preprocessing is amortized over the session because the same h used for all records that follow. With shares of $\{h^i\}$, $\mathcal{P}$ and $\mathcal{V}$ can compute shares of a polynomial evaluation $P_{A\|C\|\ell_A\|\ell_C}(h)$ locally. They also compute AES(k, IV) in 2PC to get a share of Tag(k, IV, C, A). In total, only one invocation of 2PC-AES in needed to check the tag for each record.

It is critical that $\mathcal{V}$ never responds to the same IV more than once; otherwise $\mathcal{P}$ would learn h. Specifically, in each response, $\mathcal{V}$ reveals a blinded linear combination of her shares $\{h_{\mathcal{V},i}\}$ in the form of $\mathcal{L}_{IV,X} = \text{AES}(k, IV) \oplus \Sigma_i X_i \cdot h_{\mathcal{V},i}$. It is important that the value is blinded by AES(k, IV) because a single unblinded linear combination of $\{h_{\mathcal{V},i}\}$ would allow $\mathcal{P}$ to solve for h. Therefore, if $\mathcal{V}$ responds to the same IV twice, the blinding can be removed by adding the two responses (in $\mathbb{F}_{2^{128}}$): $\mathcal{L}_{IV,X} \oplus \mathcal{L}_{IV,X'} = \Sigma_i (X_i + X'_i) \cdot h_{\mathcal{V},i}$. This follows from the nonce uniqueness requirement of GCM.

Encrypting/decrypting records. Once tags are properly checked, decryption of records is straightforward. $\mathcal{P}$ and $\mathcal{V}$ simply compute AES encryption of inc'(IV) with 2PC-AES. A subtlety to note is that $\mathcal{V}$ must check that the counters to be encrypted have not been used as IV previously. Otherwise $\mathcal{P}$ would learn h to $\mathcal{P}$ in a manner like that outlined above.

Proof Generation

Revealing a block. $\mathcal{P}$ wants to convince $\mathcal{V}$ that an AES block $B_i$ is the ith block in the encrypted record rêc. The proof strategy is as follows: 1) prove that AES block $B_i$ encrypts to the ciphertext block $\hat{B}_i$ and 2) prove that the tag is correct. Proving the correct encryption requires only 1 AES in ZKP. Naïvely done, proving the correct tag incurs evaluating the GHASH polynomial of degree 512 and 2 AES block encryptions in ZKP.

We manage to achieve a much more efficient proof by allowing $\mathcal{P}$ to reveal two encrypted messages AES(k, IV) and AES(k, 0) to $\mathcal{V}$, thus allowing $\mathcal{V}$ to verify the tag (see Equation (1)). $\mathcal{P}$ only needs to prove the correctness of encryption in ZK and that the key used corresponds to the commitment, requiring 2 AES and 1 SHA-2 ($\mathcal{P}$ commits to $k_\mathcal{P}$ by revealing a hash of the key). Thus, the total cost is 3 AES and 1 SHA-2 in ZKP.

Revealing a TLS record. The proof techniques are a simple extension from the above case. $\mathcal{P}$ reveals the entire record rec and proves correct AES encryption of all the AES blocks, resulting in a total 514 AES and 1 SHA-2 in ZKP.

Revealing a TLS record except for a block. Similar to the above case, $\mathcal{P}$ proves encryption of all the blocks in the record except one, resulting in a total 513 AES and 1 SHA-2 in ZKP.

Protocol Extensions

Adapting to Support TLS 1.3. To support TLS 1.3, the 3P-HS protocol must be adapted to a new handshake flow and a different key derivation circuit. Notably, all handshake messages after the ServerHello are now encrypted. A naïve strategy would be to decrypt them in 2PC, which would be costly as certificates are usually large. However, thanks to the key independence property of TLS 1.3, $\mathcal{P}$ and $\mathcal{V}$ can securely reveal the handshake encryption keys without affecting the secrecy of final session keys. Handshake integrity is preserved because the Finished message authenticates the handshake using yet another independent key.

Therefore the optimized 3P-HS work as follows. $\mathcal{P}$ and $\mathcal{V}$ perform ECDHE the same as before. Then they derive handshake and application keys by executing 2PC-HKDF, and reveal the handshake keys to $\mathcal{P}$, allowing $\mathcal{P}$ to decrypt handshake messages locally (i.e., without 2PC). The 2PC circuit involves roughly 30 invocations of SHA-256, totaling to approximately 70 k AND gates, comparable to that for TLS 1.2. Finally, since CBC-HMAC is not supported by TLS 1.3, DECO can only be used in GCM mode.

Query Construction is Optional. For applications that bind responses to queries, e.g., when a stock ticker is included with the quote, 2PC query construction protocols can be avoided altogether. Since TLS uses separate keys for each direction of communication, client-to-server keys can be revealed to $\mathcal{P}$ after the handshake so that $\mathcal{P}$ can query the server without interacting with $\mathcal{V}$.

Supporting Multi-Round Sessions. DECO can be extended to support multi-round sessions where $\mathcal{P}$ sends further queries depending on previous responses. After each round, $\mathcal{P}$ executes similar 2PC protocols as above to verify MAC tags of incoming responses, since MAC verification and creation is symmetric. However an additional commitment is required to prevent $\mathcal{P}$ from abusing MAC verification to forge tags.

In TLS, different MAC keys are used for server-to-client and client-to-server communication. To support multi-round sessions, $\mathcal{P}$ and $\mathcal{V}$ run 2PC to verify tags for the former, and create tags on fresh messages for the latter. Previous description herein specified the protocols to create (and verify) MAC tags. Now we discuss additional security considerations for multi-round sessions.

When checking tags for server-to-client messages, we must ensure that $\mathcal{P}$ cannot forge tags on messages that are not originally from the server. Suppose $\mathcal{P}$ wishes to verify a tag T on message M. We have $\mathcal{P}$ first commit to T, then $\mathcal{P}$ and $\mathcal{V}$ run a 2PC protocol to compute a tag T' on message M. $\mathcal{P}$ is asked to open the commitment to $V$ and if T≠T', $V$ aborts the protocol. Since $\mathcal{P}$ doesn't know the MAC key, $\mathcal{P}$ cannot compute and commit to a tag on a message that is not from the server.

When creating tags for client-to-server messages, $V$ makes sure MAC tags are created on messages with increasing sequence numbers, as required by TLS. This also prevents a malicious $\mathcal{P}$ from creating two messages with the same sequence number, because there is no way for $V$ to distinguish which one was sent to the server.

An Alternative DECO Protocol: Proxy Mode. As shown in TABLE 1, the HMAC mode of DECO is highly efficient and the runtime of creating and verifying HMAC tags in 2PC is independent of record size. The GCM mode is efficient for small requests with preprocessing, but can be expensive for large records. We now present a highly efficient alternative that avoids post-handshake 2PC protocols altogether.

In this alternative, the verifier $V$ acts as a proxy between the prover $\mathcal{P}$ and the TLS server $\mathcal{S}$, i.e., $\mathcal{P}$ sends/receives messages to/from $\mathcal{S}$ through $V$. The modified flow of the DECO protocol is as follows: after the three-party handshake, $\mathcal{P}$ commits to her key share $k_\mathcal{P}$ then $V$ reveals $k_V$ to $\mathcal{P}$. Therefore $\mathcal{P}$ now has the entire session key $k=k_\mathcal{P}+k_V$. As $\mathcal{P}$ uses k to continue the session with the server, $V$ records the proxy traffic. After the session concludes, $\mathcal{P}$ proves statements about the recorded session the same as before.

In such an embodiment, the three-party handshake provides unforgeability. Unlike CBC-HMAC, GCM is not committing: for a given ciphertext and tag (C, T) encrypted with key k, one can find k'≠k that decrypts C to a different plaintext while computing the same tag, as GCM MAC is not collision-resistant. To prevent such attacks, the above protocol requires $\mathcal{P}$ to commit to her key share before learning the session key.

Security properties and network assumptions relating to the proxy mode protocol will now be described. The verifier-integrity and privacy properties are clear, as a malicious $V$ cannot break the integrity and privacy of TLS (by assumption).

For prover integrity, though, we need to assume that the proxy can reliably connect to $\mathcal{S}$ throughout the session. First, we assume the proxy can ascertain that it indeed is connected with $\mathcal{S}$. Moreover, we assume messages sent between the proxy and $\mathcal{S}$ cannot be tampered with by $\mathcal{P}$, who knows the session keys and thus could modify the session content.

Note that during the three-party handshake, $V$ can ascertain the server's identity by checking the server's signature over a fresh nonce (in standard TLS). After the handshake, however, $V$ has to rely on network-layer indicators, such as IP addresses. In practice, $V$ must therefore have correct, up-to-date DNS records, and that the network between $V$ and the server (e.g., their ISP and the backbone network) must be properly secured against traffic injection, e.g., through Border Gateway Protocol (BGP) attacks. Eavesdropping is generally not problematic in illustrative embodiments.

These assumptions have been embraced by other systems in a similar proxy setting, as BGP attacks are challenging to mount in practice. We can further enhance our protocol against traffic interception by distributing verifier nodes geographically. Moreover, various known detection techniques can be deployed by verifiers. Often BGP attacks are documented after the fact, therefore, when applicable, applications of DECO can be enhanced to support revocation of affected sessions (for example, when DECO is used to issue credentials in an identity system.)

This alternative protocol represents a different performance-security tradeoff. It's highly efficient because no intensive cryptography occurs after the handshake, but it requires additional assumptions about the network and therefore only withstands a weaker network adversary.

Key-Value Grammars and Two-Stage Parsing

Preliminaries and Notation. We denote context-free grammars (CFGs) as $\mathcal{G}=(V, \Sigma, P, S)$ where V is a set of non-terminal symbols, $\Sigma$ a set of terminal symbols, $P:V\to(V\cup\Sigma)^*$ a set of productions or rules and $S\in V$ the start-symbol. We define production rules for CFGs in standard notation using '-' to denote a set minus and '..' to denote a range. For a string w, a parser determines if $w\in\mathcal{G}$ by constructing a parse tree for w. The parse tree represents a sequence of production rules which can then be used to extract semantics.

Key-Value Grammars. These are grammars with the notion of key-value pairs. These grammars are particularly interesting for DECO since most API calls and responses are, in fact, key-value grammars.

$\mathcal{G}$ is said to be a key-value grammar if there exists a grammar $\mathcal{H}$, such that given any $s\in\mathcal{G}$, $s\in\mathcal{H}$, and $\mathcal{H}$ can be defined by the following rules:

S→object
object→noPairsString open pair pairs close
pair→start key middle value end
pairs→pair pairs|""
key→chars
value→chars object
chars→char chars|""
char→Unicode-escaped|escape escaped|addedChars
special→startSpecial|middleSpecial|endSpecial
start→unescaped$_s$ startSpecial
middle→unescaped$_m$ middleSpecial
end→unescaped$_e$ endSpecial
escaped→special|escape|. . .

In the above, S is the start non-terminal (represents a sentence in $\mathcal{H}$), the non-terminals open and close demarcate the opening and closing of the set of key-value pairs and start, middle, end are special strings demarcating the start of a key-value pair, separation between a key and a value and the end of the pair respectively.

In order to remove ambiguity in parsing special characters, i.e., characters which have special meaning in parsing a grammar, a special non-terminal, escape is used. For example, in JSON, keys are parsed when preceded by 'whitespace double quotes' (") and succeeded by double quotes. If a key or value expression itself must contain double quotes, they must be preceded by a backslash (\), i.e., escaped. In the above rules, the non-terminal unescaped before special characters means that they can be parsed as special characters. So, moving forward, we can assume that the production of a key-value pair is unambiguous. So, if a substring R' of a string R in the key-value grammar $\mathcal{G}$ parses as a pair, R' must correspond to a pair in the parse tree of R.

Note that in the above key-value grammar, middle cannot derive an empty string, i.e., a non-empty string must mark middle to allow parsing keys from values. However, one of start and end can have an empty derivation, since they only demarcate the separation between value in one pair from key in the next. Finally, we note that in the two-stage parsing for key-value grammars in some embodiments, we only we consider permissible paths with the requirement that the selectively opened string, $R_{open}$ corresponds to a pair.

Two-Stage Parsing for a Locally Unique Key. Many key-value grammars enforce key uniqueness within a scope. For example, in JSON, it can be assumed that keys are unique within a JSON object, even though there might be duplicated keys across objects. The two-stage parsing for such grammars can be reduced to parsing a substring. Specifically, Trans extracts from R a continuous substring R', such that the scope of a pair can be correctly determined, even within R'. For instance, in JSON, if $cons_{G,G'}$(R, R') returns true if and only if R' is a prefix of R, then only parsing R' as a JSON, up to generating the sub-tree yielding $R_{open}$ is sufficient for determining whether a string $R_{open}$ corresponds to the correct context in R.

Grammars with Unique Keys. Given a key-value grammar $G$ we define a function which checks for uniqueness of keys, denoted $u_G$. Given a string $s \in G$ and another string k, $u_G$(s, k)=true if and only if there exists at most one substring of s that can be parsed as start k middle. Since $s \in G$, this means, in any parse tree of s, there exists at most one branch with node key and derivation k. Let $Parser_G$ be a function that returns true if its input is in the grammar $G$. We say a grammar $G$ is a key-value grammar with unique keys if for all $s \in G$ and all possible keys k, $u_G$ (s, k)=true, i.e., for all strings R, C:

$$\frac{\langle Parser_G, R \Rightarrow true \rangle}{\langle u_G, (R, C) \rangle \Rightarrow true}.$$

Concrete Two-Stage Parsing for Unique-Key Grammars. Let $U$ be a unique-key grammar as given above. We assume that $U$ is LL(1). This is the case for example grammars of interest described previously. General LL(1) parsing algorithms are known.

We instantiate a context function, $CTX_U$ for a set T, such that T contains the permissible paths to a pair for strings in $U$. We additionally allow $CTX_U$ to take as input an auxiliary restriction, a key k (the specified key in $P$'s output $R_{open}$). The tuple (T, k) is denoted S and $CTX_U$ (S , ., .) $CTX_{U,S}$.

Let $P$ be a grammar given by the rule $S_P \to$ pair, where pair is the non-terminal in the production rules for $U$ and $S_P$ is the start symbol in $P$. We define $Parser_{P,k}$ as a function that decides whether a string s is in $P$ and if so, whether the key in s equals k. On input R, $R_{open}$, $CTX_{U,S}$ checks that: (a) $R_{open}$ is a valid key-value pair with key k by running $Parser_{P,k}$ (b) $R_{open}$ parses as a key-value pair in R by running an LL(1) parsing algorithm to parse R.

FIG. 14 shows example pseudocode for the function $CTX_{U,S}$ to parse a string R in a key-value grammar $U$, and search for the production of a particular key-value pair $R_{open}$. Here, PTable, the LL(1) parse-table for $U$ is hard-coded into $CTX_{U,S}$.

To avoid expensive computation of $CTX_{U,S}$ on a long string R, we introduce the transformation Trans, to extract the substring R' of R, such that R'=$R_{open}$ as per the requirements.

For string s, t, we also define functions substring(s, t), that returns true if t is a substring of s and equal(s, t) which returns true if s=t. We define $cons_{U,P}$ with the rule:

$$\frac{\langle substring(R, R') \rangle \Rightarrow true \quad \langle Parser_{P,k}, R' \rangle \Rightarrow true}{\langle cons_{U,P}, (R, R') \rangle \Rightarrow true}$$

and S'={$S_P$}. Meaning, $CTX_P$(S, R', $R_{open}$=true whenever equal(R', $R_{open}$) and the rule $$\frac{\langle equal, (R', R_{open}) \rangle \Rightarrow b}{\langle CTX_P(S, R', R_{open}) \Rightarrow b}$$

holds for all strings R', $R_{open}$.

It can be shown that ($cons_{U,P}$,S') are correct with respect to S. More particularly, if R' is sub string of R, a key-value pair $R_{open}$ is parsed by $Parser_P$ then the same pair must have been a substring of $U$. Due to global uniqueness of keys in $U$, there exists only one such pair $R_{open}$ and $CTX_U$ (S, R, $R_{open}$) must be true. The additional protocol details above, like those described elsewhere herein, are presented by way of illustrative example only, and are not intended to be limiting in any way. Other embodiments can utilize alternative protocol arrangements in implementing decentralized oracles as disclosed herein.

As indicated above, illustrative embodiments of decentralized oracles as disclosed herein can be implemented in a wide variety of different applications.

For example, DECO can be used to implement a personal data marketplace, where users control and sell their personal data. It is well known that web services profit from monetizing user data. A personal data marketplace implemented using the techniques disclosed herein can disrupt this data monopoly by enabling users to sell their data in an open marketplace. DECO is a key enabler to a personal data marketplace in illustrative embodiments because DECO enables buyers to verify the origin and integrity of the data from websites. DECO also allows sellers to preprocess the data, e.g., redacting sensitive information, for privacy protection while preventing sellers from cheating. Some implementations utilize DECO to provide verifiable claims against price discrimination.

As another example, DECO can be used to provide proof of financial solvency. As a more particular illustration of an arrangement of this type, with DECO, Alice can prove to Bob that her balance with a particular bank is more than $5000. This simple proof not only shows Alice's financial solvency but also her ability to open an account (e.g., that Alice is not on any sanctions lists, as banks perform anti-money laundering (AML) screening). Importantly, DECO protects Alice's privacy by revealing only the fact that her balance is higher than $5,000, not her actual balance or identity.

As a further example, DECO can be used to provide proof of account ownership. In one illustration of such an arrangement, with DECO, one can prove ownership of accounts, e.g., email accounts, social media accounts, etc., in anonymity. For example, Alice can prove to Bob that she owns an email account ending with @example.org without revealing what the account name is. This proves Alice's affiliation with a certain organization, which is useful for, e.g., whistleblowing, anonymous complaints, etc.

Additional examples of applications of decentralized oracles as disclosed herein include credential recovery and decentralized identity. As an illustration of the former, DECO can enable a user to prove, in a privacy-preserving manner that avoids use of OAUTH, that she has access to a particular web resource, e.g., a Facebook account. This can enable a user to leverage an existing service to prove her identity for, e.g., key recovery. As an illustration of the latter, DECO can also enable to a user to prove, in a privacy-preserving manner, that she has certain characteristics as asserted by a third-party provider (e.g., she's over 18). This is an example of what is also referred to herein as an anonymous age proof. Such a proof can be used to construct a credential in a decentralized identity system.

The foregoing decentralized oracle applications are examples only, and should not be construed as limiting in any way. Additional details regarding implementation of these and other example applications of decentralized oracles as disclosed herein can be found can be found elsewhere herein.

Communications between the various elements of an information processing system configured to implement one or more decentralized oracles as disclosed herein are assumed to take place over one or more networks. A given such network can illustratively include, for example, a global computer network such as the Internet, a WAN, a LAN, a satellite network, a telephone or cable network, a cellular network such as a 3G, 4G or 5G network, a wireless network implemented using a wireless protocol such as Bluetooth, WiFi or WiMAX, or various portions or combinations of these and other types of communication networks.

A given processing device implementing at least a portion of the functionality of a decentralized oracle as disclosed herein can include components such as a processor, a memory and a network interface. The processor is assumed to be operatively coupled to the memory and to the network interface. The memory stores software program code for execution by the processor in implementing portions of the functionality of the processing device.

It is to be appreciated that the particular arrangements shown and described in conjunction with FIGS. 1 through 14 herein are presented by way of illustrative example only, and numerous alternative embodiments are possible. The various embodiments disclosed herein should therefore not be construed as limiting in any way. Numerous alternative arrangements for implementing decentralized oracles can be utilized in other embodiments. For example, those skilled in the art will recognize that alternative processing operations and associated system entity configurations can be used in other embodiments. It is therefore possible that other embodiments may include additional or alternative system entities, relative to the entities of the illustrative embodiments. Also, the particular system and device configurations and associated decentralized oracles can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, a GPU, an ALU, a DSP, or other similar processing device component, as well as other types and arrangements of processing circuitry, in any combination. For example, at least a portion of the functionality of a decentralized oracle provided by a given processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of RAM, ROM, flash memory, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with decentralized oracles as well as other related functionality.

Processing devices in a given embodiment can include, for example, laptop, tablet or desktop personal computers, mobile telephones, or other types of computers or communication devices, in any combination. For example, a computer or mobile telephone can be utilized as a processing device for implementing at least portions of the functionality associated with a decentralized oracle as disclosed herein. These and other communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure, including virtualization infrastructure utilizing Docker containers or other types of Linux containers implemented using operating system level virtualization based on Linux control groups or other similar mechanisms.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with decentralized oracle entities or related components of a system can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

Thus, techniques illustrated in some embodiments herein in the context of providing decentralized oracles for TLS can be adapted in a straightforward manner for use in other contexts. Accordingly, illustrative embodiments of the invention should not be viewed as limited to TLS or its associated processing contexts.

It is also to be appreciated that the particular process steps used in the embodiments described herein are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative processing contexts. In addition, the particular assumptions made herein in the context of describing certain embodiments need not apply in other embodiments. These and numerous other alternative embodiments will be readily apparent to those skilled in the art.

What is claimed is:

1. An apparatus comprising:
a verifier device comprising a processor and a memory, with the processor being coupled to the memory;
the verifier device being configured to communicate over one or more networks with a client device and a server device;
wherein the verifier device is further configured:
to participate in a three-party handshake protocol with the client device and the server device in which the verifier device and the client device obtain respective shares of a session key of a secure session with the server device;
to receive from the client device a commitment relating to the secure session with the server device;
responsive to receipt of the commitment, to release to the client device additional information relating to the secure session that was not previously accessible to the client device; and
to verify correctness of at least one characterization of data obtained by the client device from the server device as part of the secure session, based at least in part on the commitment and the additional information.

2. The apparatus of claim 1 wherein the verifier device is further configured to initiate one or more automated actions responsive to the verification of the correctness of the at least one characterization of the data obtained by the client device from the server device.

3. The apparatus of claim 1 wherein the verifier device comprises a particular oracle node of a set of oracle nodes of a decentralized oracle system.

4. The apparatus of claim 1 wherein the verifier device comprises a distributed verifier device in which functionality of the verifier device is distributed across multiple distinct processing devices.

5. The apparatus of claim 1 wherein the server device comprises a transport layer security (TLS) enabled server device and the secure session comprises a TLS session.

6. The apparatus of claim 1 wherein the commitment relating to the secure session comprises a commitment to query response data obtained by the client device from the server device as part of the secure session.

7. The apparatus of claim 1 wherein the commitment relating to the secure session comprises a commitment to a prover key established by the client device in conjunction with the three-party handshake protocol but not previously accessible to the verifier device.

8. The apparatus of claim 1 wherein the additional information released to the client device responsive to receipt of the commitment comprises a verifier key established by the verifier device in conjunction with the three-party handshake protocol but not previously accessible to the client device.

9. The apparatus of claim 1 wherein the verifier device is further configured to operate as a proxy for the client device in conjunction with interactions between the client device and the server device such that the verifier device automatically obtains ciphertexts exchanged between the client device and the server device as part of the secure session via the verifier device operating as the proxy.

10. The apparatus of claim 1 wherein the verifier device is further configured to receive from the client device one or more statements characterizing the data obtained by the client device from the server device as part of the secure session.

11. The apparatus of claim 10 wherein a given one of the one or more statements comprises a selectively-revealed substring of query response data obtained by the client device from the server device as part of the secure session.

12. The apparatus of claim 10 wherein a given one of the one or more statements is configured to provide context integrity through utilization of a multi-stage parsing protocol in which query response data obtained by the client device from the server device as part of the secure session is preprocessed by the client device to generate reduced data that is subsequently parsed by the client device in conjunction with generation of the given statement to be sent by the client device to the verifier device.

13. The apparatus of claim 1 wherein in conjunction with the three-party handshake protocol, the client device and the verifier device jointly establish one or more shared session keys with the server device, with the client device having a first share of a given one of the one or more shared session keys, the verifier device having a second share of the given shared session key, and the server device having a composite session key combining the first and second shares.

14. The apparatus of claim 1 wherein in conjunction with the three-party handshake protocol, the client device receives from the server device an encryption key that is not accessible to the verifier device.

15. The apparatus of claim 1 wherein the verifier device and the client device collaborate using the respective shares of the session key of the secure session with the server device to generate a query that is provided by the client device to the server device to request that the server device send the data to the client device.

16. The apparatus of claim 15 wherein the verifier device and the client device collaborate using the respective shares of the session key of the secure session with the server device to validate a response that is provided by the server device to the client device responsive to the query.

17. The apparatus of claim 1 wherein in conjunction with the three-party handshake protocol, the client device and the verifier device establish respective prover and verifier keys.

18. The apparatus of claim 17 wherein verifying correctness of at least one characterization of data obtained by the client device from the server device as part of the secure session comprises verifying a proof provided by client device to the verifier device wherein the proof is generated by the client device based at least in part on (i) the prover key established by the client device in conjunction with the three-party handshake protocol, (ii) the verifier key established by the verifier device in conjunction with the three-party handshake protocol, and (iii) secret information of the client device.

19. The apparatus of claim 1 wherein verifying correctness of at least one characterization of data obtained by the client device from the server device as part of the secure session comprises:
   obtaining data derived from at least a portion of at least one ciphertext of the secure session; and
   verifying correctness of at least one characterization of that data by the client device.

20. A method performed by a verifier device configured to communicate over one or more networks with a client device and a server device, the method comprising:
   participating in a three-party handshake protocol with the client device and the server device in which the verifier device and the client device obtain respective shares of a session key of a secure session with the server device;
   receiving from the client device a commitment relating to the secure session with the server device;
   responsive to receipt of the commitment, releasing to the client device additional information relating to the secure session that was not previously accessible to the client device; and
   verifying correctness of at least one characterization of data obtained by the client device from the server device as part of the secure session, based at least in part on the commitment and the additional information;
   wherein the verifier device performing the method comprises a processor coupled to a memory.

21. The method of claim 20 wherein verifying correctness of at least one characterization of data obtained by the client device from the server device as part of the secure session comprises:
   obtaining data derived from at least a portion of at least one ciphertext of the secure session; and
   verifying correctness of at least one characterization of that data by the client device.

22. The method of claim 20 wherein the verifier device is further configured to operate as a proxy for the client device in conjunction with interactions between the client device and the server device such that the verifier device automatically obtains ciphertexts exchanged between the client device and the server device as part of the secure session via the verifier device operating as the proxy.

23. A computer program product comprising a non-transitory processor-readable storage medium having stored therein program code of one or more software programs, wherein the program code when executed by a verifier device configured to communicate over one or more networks with a client device and a server device, the verifier device comprising a processor coupled to a memory, causes the verifier device:
   to participate in a three-party handshake protocol with the client device and the server device in which the verifier device and the client device obtain respective shares of a session key of a secure session with the server device;
   to receive from the client device a commitment relating to the secure session with the server device;
   responsive to receipt of the commitment, to release to the client device additional information relating to the secure session that was not previously accessible to the client device; and
   to verify correctness of at least one characterization of data obtained by the client device from the server device as part of the secure session, based at least in part on the commitment and the additional information.

24. The computer program product of claim 23 wherein verifying correctness of at least one characterization of data obtained by the client device from the server device as part of the secure session comprises:
   obtaining data derived from at least a portion of at least one ciphertext of the secure session; and
   verifying correctness of at least one characterization of that data by the client device.

25. The computer program product of claim 23 wherein the verifier device is further configured to operate as a proxy for the client device in conjunction with interactions between the client device and the server device such that the verifier device automatically obtains ciphertexts exchanged between the client device and the server device as part of the secure session via the verifier device operating as the proxy.

* * * * *